(12) United States Patent
Yamamizu

(10) Patent No.: US 7,697,162 B2
(45) Date of Patent: Apr. 13, 2010

(54) IMAGE READING APPARATUS AND METHOD THAT DETERMINES ORIGINALITY OF PAPER SHEET USING FINGERPRINT OF REAR SURFACE

(75) Inventor: Hiroshi Yamamizu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 483 days.

(21) Appl. No.: 11/830,518

(22) Filed: Jul. 30, 2007

(65) Prior Publication Data

US 2008/0130025 A1 Jun. 5, 2008

(30) Foreign Application Priority Data

Dec. 5, 2006 (JP) .............................. 2006-328848

(51) Int. Cl.
  H04N 1/00 (2006.01)
  G06K 15/00 (2006.01)
  G06K 9/00 (2006.01)
  B41M 3/14 (2006.01)
  G06K 9/68 (2006.01)

(52) U.S. Cl. .................. 358/1.6; 358/1.14; 358/3.28; 358/468; 382/108; 382/190; 382/218; 382/312

(58) Field of Classification Search .................. 358/1.6, 358/1.9, 3.28, 1.14, 504, 406, 448, 468, 474; 382/108, 112, 190, 286, 209, 217, 218, 312; 356/71, 600, 237.2; 340/5.86
See application file for complete search history.

(56) References Cited

U.S. PATENT DOCUMENTS

| | | | | |
|---|---|---|---|---|
| 7,125,114 B2 * | 10/2006 | Tsujimoto | ................... | 358/1.6 |
| 7,336,394 B2 * | 2/2008 | Tsujimoto | ................... | 358/1.9 |
| 2007/0146808 A1 * | 6/2007 | Kudo et al. | ................. | 358/448 |
| 2007/0263242 A1 * | 11/2007 | Takahashi | .................. | 358/1.14 |
| 2008/0088887 A1 * | 4/2008 | Morikawa | ................... | 358/447 |
| 2009/0002784 A1 * | 1/2009 | Morikawa | ................... | 358/520 |
| 2009/0074301 A1 * | 3/2009 | Yamamizu | .................. | 382/209 |

* cited by examiner

Primary Examiner—Scott A Rogers
(74) Attorney, Agent, or Firm—Fitzpatrick, Cella, Harper & Scinto

(57) ABSTRACT

An image reading apparatus is provided that includes a reading unit for reading images from both sides of an original, an adjusting unit that adjusts image data of the front surface and image data of the rear surface of the original, a determination unit that performs determination processing for paper fingerprint information of the rear surface of the original using image data that is obtained after adjustment of the image data of the rear surface by the adjusting unit, and a printing unit that prints the image data of the front surface. The adjusting unit performs a different adjustment for the image data of the front surface and the image data of the rear surface of the original.

9 Claims, 18 Drawing Sheets

F I G. 4
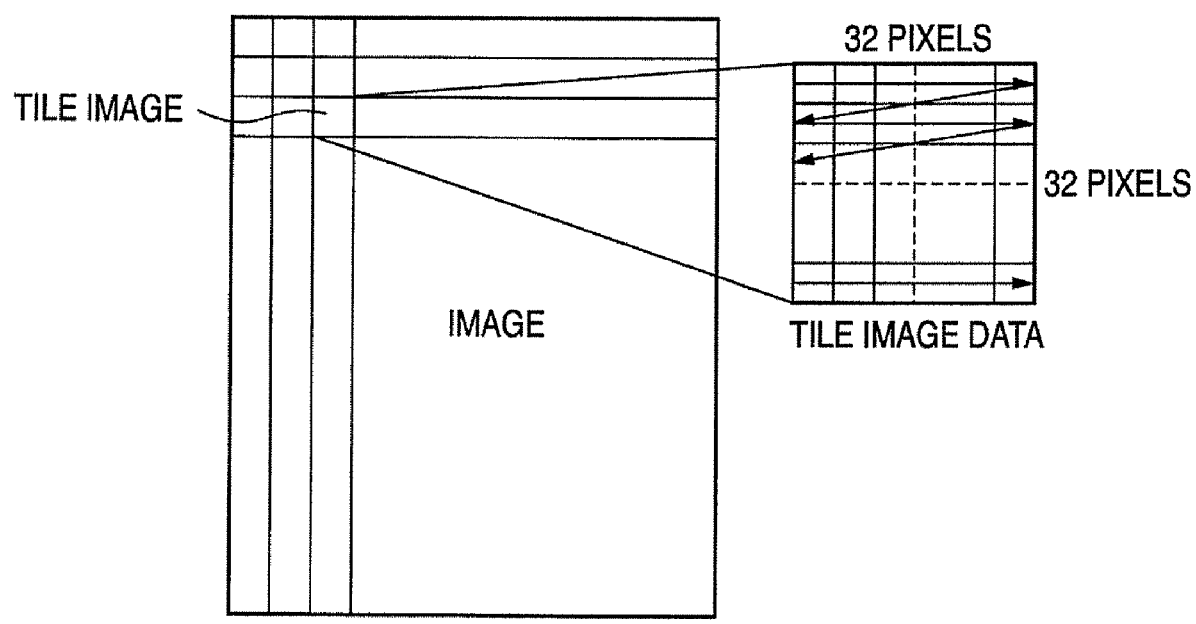

FIG. 15A  FIG. 15B
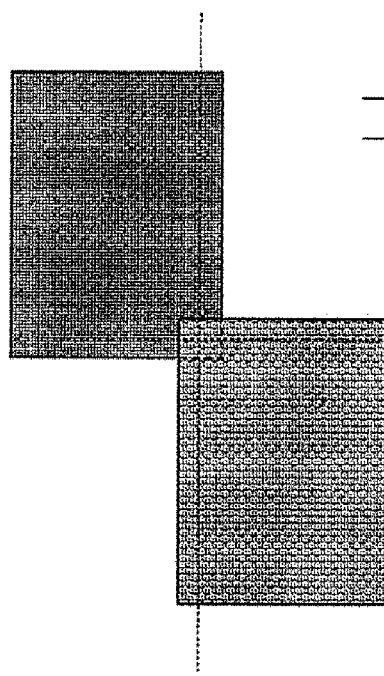
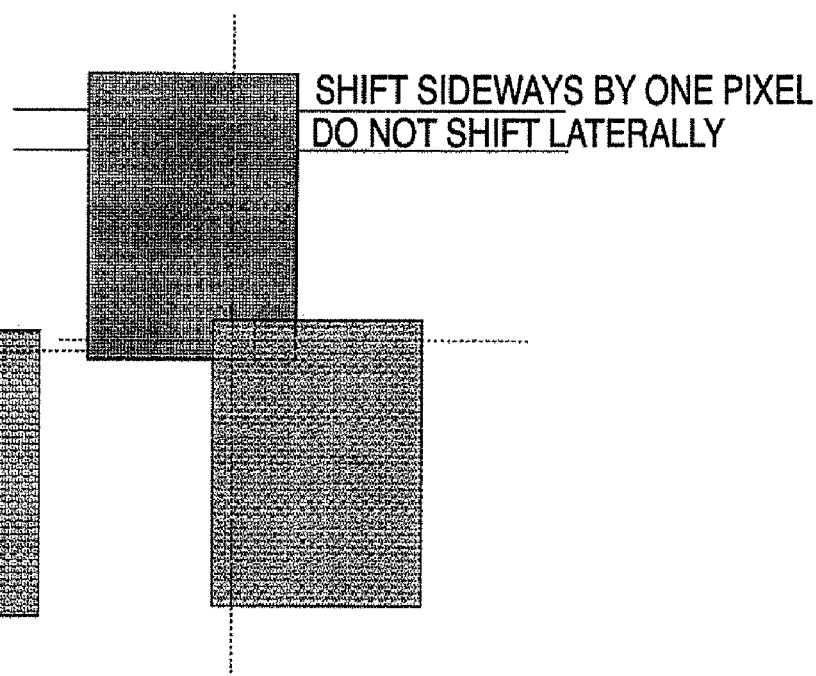
SHIFT SIDEWAYS BY ONE PIXEL
DO NOT SHIFT LATERALLY
FIG. 15C  FIG. 15D
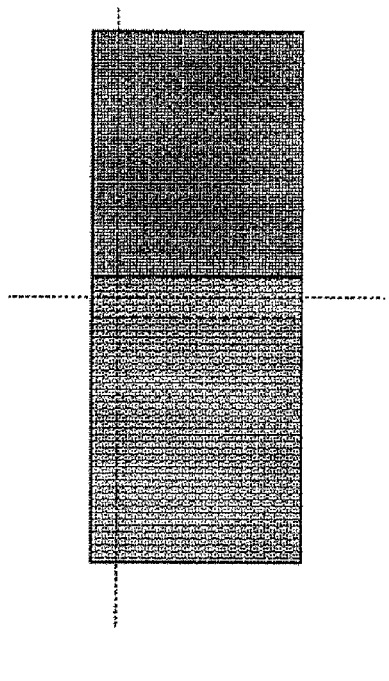
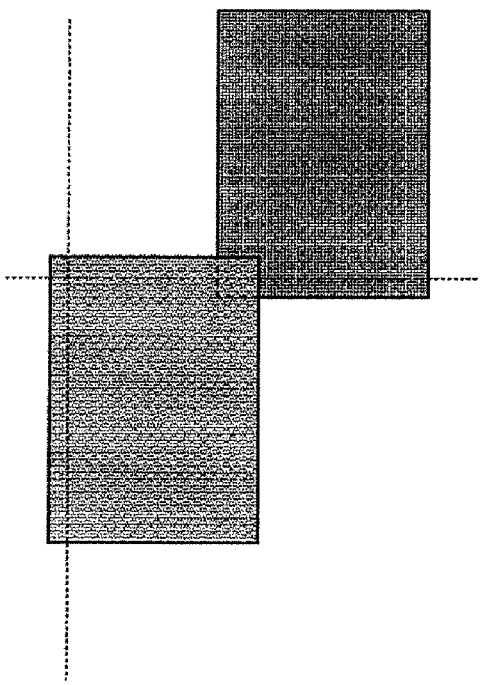

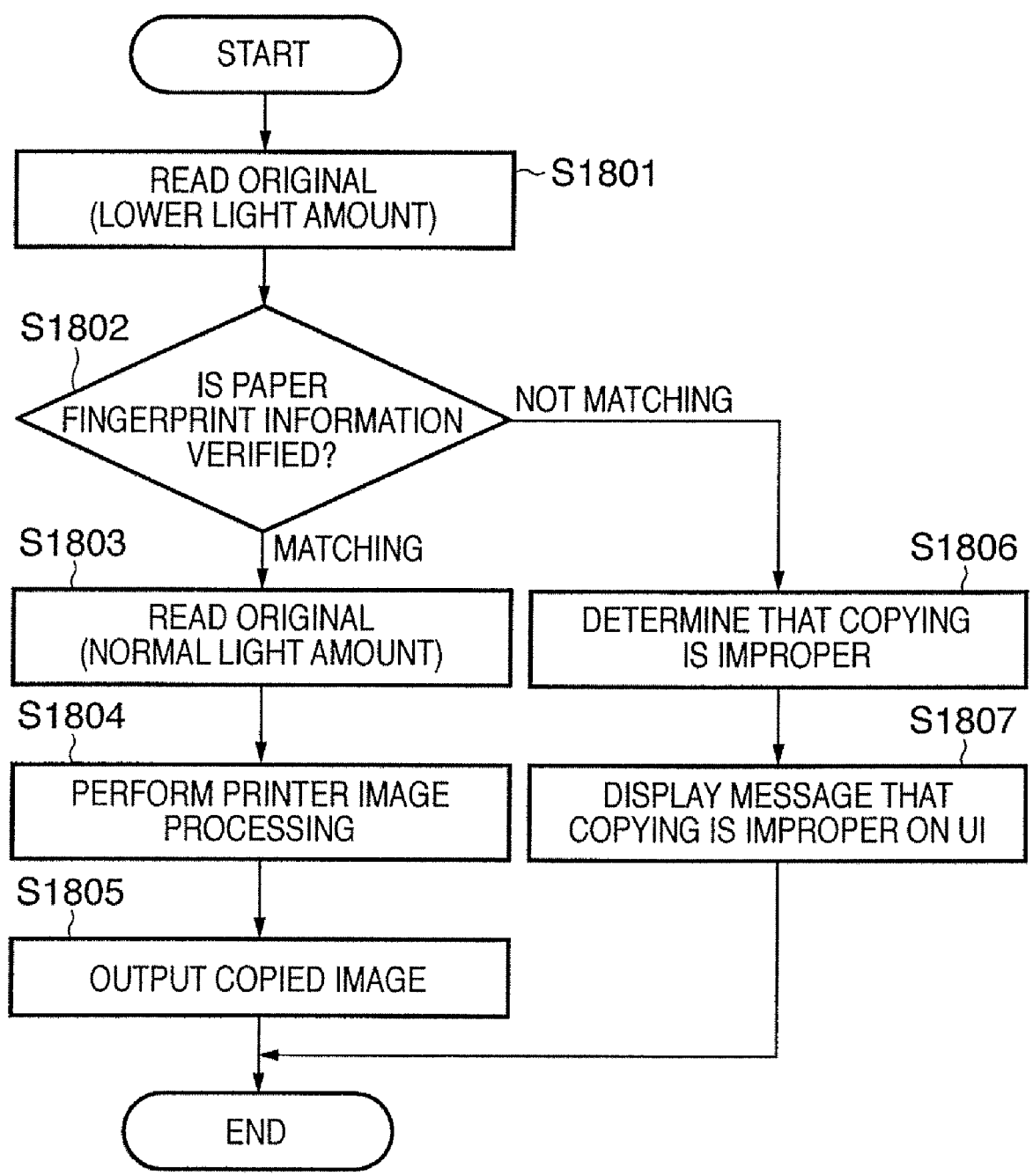

IMAGE READING APPARATUS AND METHOD THAT DETERMINES ORIGINALITY OF PAPER SHEET USING FINGERPRINT OF REAR SURFACE

BACKGROUND OF THE INVENTION

1. Field of the Invention

The present invention relates to an image reading apparatus in a system that certifies the originality of a paper sheet by using a paper fingerprint that represents the bumps and entanglements of random fibers on the paper surface, as well as a control method of the image reading apparatus and an image reading method.

2. Description of the Related Art

Because the bumps and entanglements of fibers on the surface of a paper sheet cannot be controlled in the manufacturing process, each individual paper sheet has a different pattern, similarly to the way in which the fingerprint of each person is unique. This unique pattern is referred to as a "paper fingerprint". By identifying and managing paper fingerprint information that represents this kind of paper fingerprint, the paper fingerprint can be utilized as original certifying means.

However, when it is attempted to acquire the aforementioned paper fingerprint information using a general-purpose scanner, there is a problem that the amount of light of the scanner light source at the time of normal scanning is too large, and is it not possible to extract the paper fingerprint information because the image of the location (background of the paper sheet) from which it is desired to acquire the paper fingerprint information is scanned as white.

SUMMARY OF THE INVENTION

An embodiment of the present invention provides an image reading apparatus that can favorably perform reading of image data from an original and can also read paper fingerprint information of the original. In particular, the present invention realizes to solve the above problem when performing two-sided reading.

According to one aspect of the present invention, there is provided an image reading apparatus, comprising: a reading unit adapted to read images from both sides of an original; an adjusting unit adapted to adjust image data of a front surface and image data of a rear surface of the original; a determination unit adapted to determine processing for paper fingerprint information of the rear surface of the original using image data obtained after adjustment of the image data of the rear surface that is adjusted by the adjusting unit; and a printing unit adapted to print the image data of the front surface, wherein the adjusting unit performs a different adjustment for the image data of the front surface and the image data of the rear surface of the original.

According to another aspect of the present invention, there is provided an image reading method, comprising: reading images from both sides of an original; adjusting image data of a front surface and image data of a rear surface of the original; determining processing for paper fingerprint information of the rear surface of the original using image data obtained after adjustment of the image data of the rear surface that is adjusted in the adjusting step; and printing the image data of the front surface, wherein the adjusting step performs a different adjustment for the image data of the front surface and the image data of the rear surface of the original.

Further features of the present invention will become apparent from the following description of exemplary embodiments with reference to the attached drawings.

BRIEF DESCRIPTION OF THE DRAWINGS

FIG. 4 is a view that conceptually represents tile image data;

FIG. 15A is a view illustrating the way of determining $E_{1 \times 1}$, FIG. 15B is a view illustrating the way of determining $E_{2 \times 1}$, FIG. 15C is a view illustrating the way of determining $E_{n \times 1}$, and FIG. 15D is a view illustrating the way of determining $E_{2n-1 \times 1}$;

FIG. 18 is a view showing the flow of operations when performing a second scan for paper fingerprint verification and a copy and print operation.

DESCRIPTION OF THE EMBODIMENTS

Embodiments for implementing the present invention are described in detail below with reference to the drawings. According to the present embodiments, an example is described of an image reading apparatus in a system that certifies the originality of a paper sheet using a paper fingerprint that represents bumps or entanglements of random fibers on the surface of a paper sheet that are produced during the paper manufacturing process.

<System Configuration (FIG. 1)>

Figure 1:
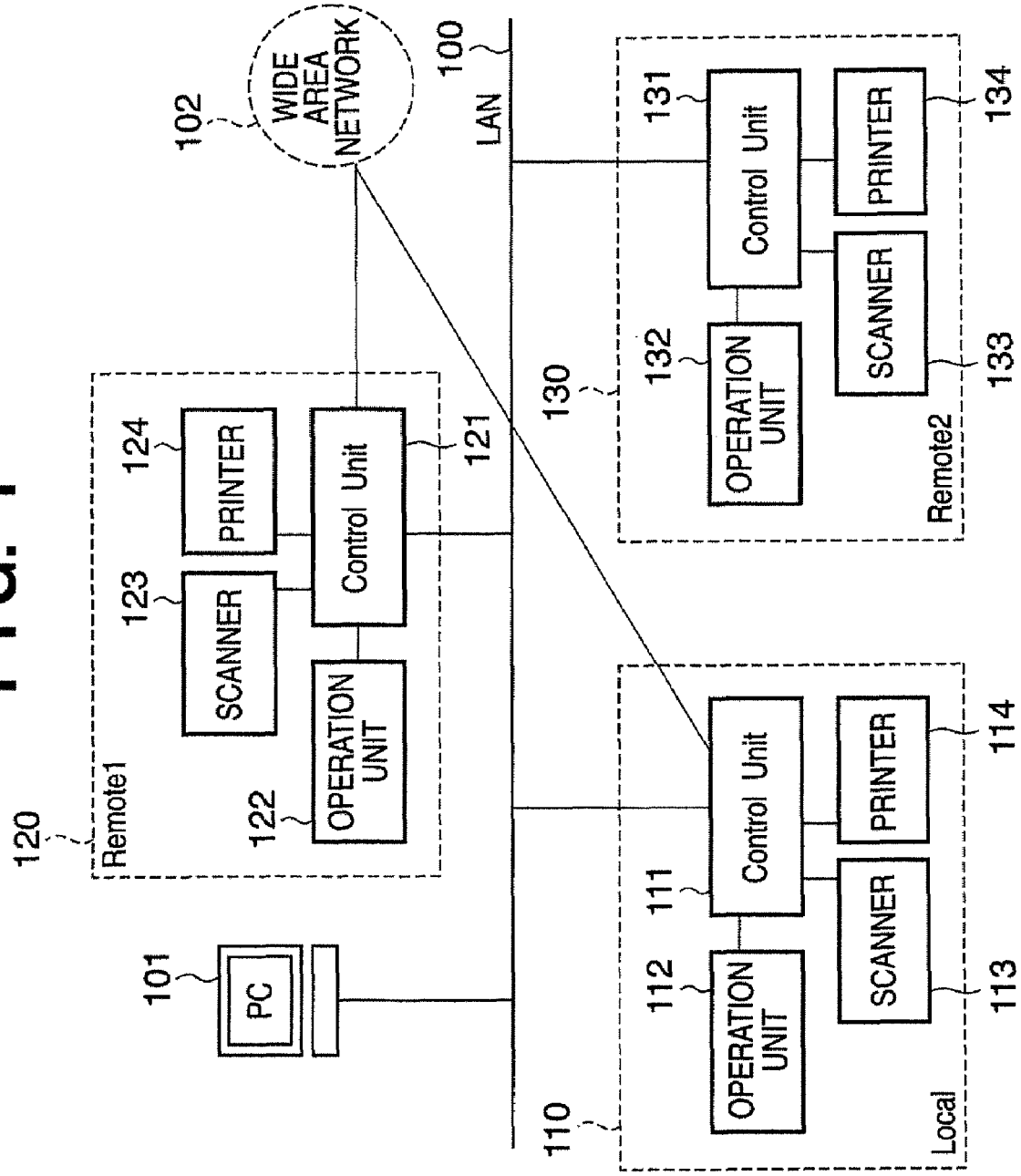
FIG. 1 is a block diagram that shows the overall configuration of an image forming system according to the first embodiment.

FIG. 1 is a block diagram that shows the overall configuration of an image forming system according to the first embodiment. As shown in FIG. 1, an image forming apparatus 110 has a scanner unit 113 as an image input device, a printer unit 114 as an image output device, a control unit 111, and an operation unit 112 as a user interface. The operation unit 112, the scanner unit 113, and the printer unit 114 are respectively connected to the control unit 111, and are controlled by commands from the control unit 111. The control unit 111 is also connected to network communication means such as a local area network (LAN) 100, and a wide area network (WAN) 102. Sending by G3 and G4 facsimile transmission that includes color image sending is possible from the wide area network 102.

Other image forming apparatuses 120 and 130 that have a similar configuration to the image forming apparatus 110 are also connected to the LAN 100. More specifically, the image forming apparatus 120 has a scanner unit 123, a printer unit 124, and an operation unit 122 that are respectively connected to and controlled by a control unit 121. Further, the image forming apparatus 130 has a scanner unit 133, a printer unit 134, and an operation unit 132 that are respectively connected to and controlled by a control unit 131.

A personal computer (PC) 101 is connected to the network communication means such as the LAN 100. The personal computer 101 is capable of sending and receiving files using a standard file transfer protocol such as FTP or SMB and of sending and receiving electronic mail.

<External Appearance of Image Forming Apparatus 110 (FIG. 2)>

Figure 2:
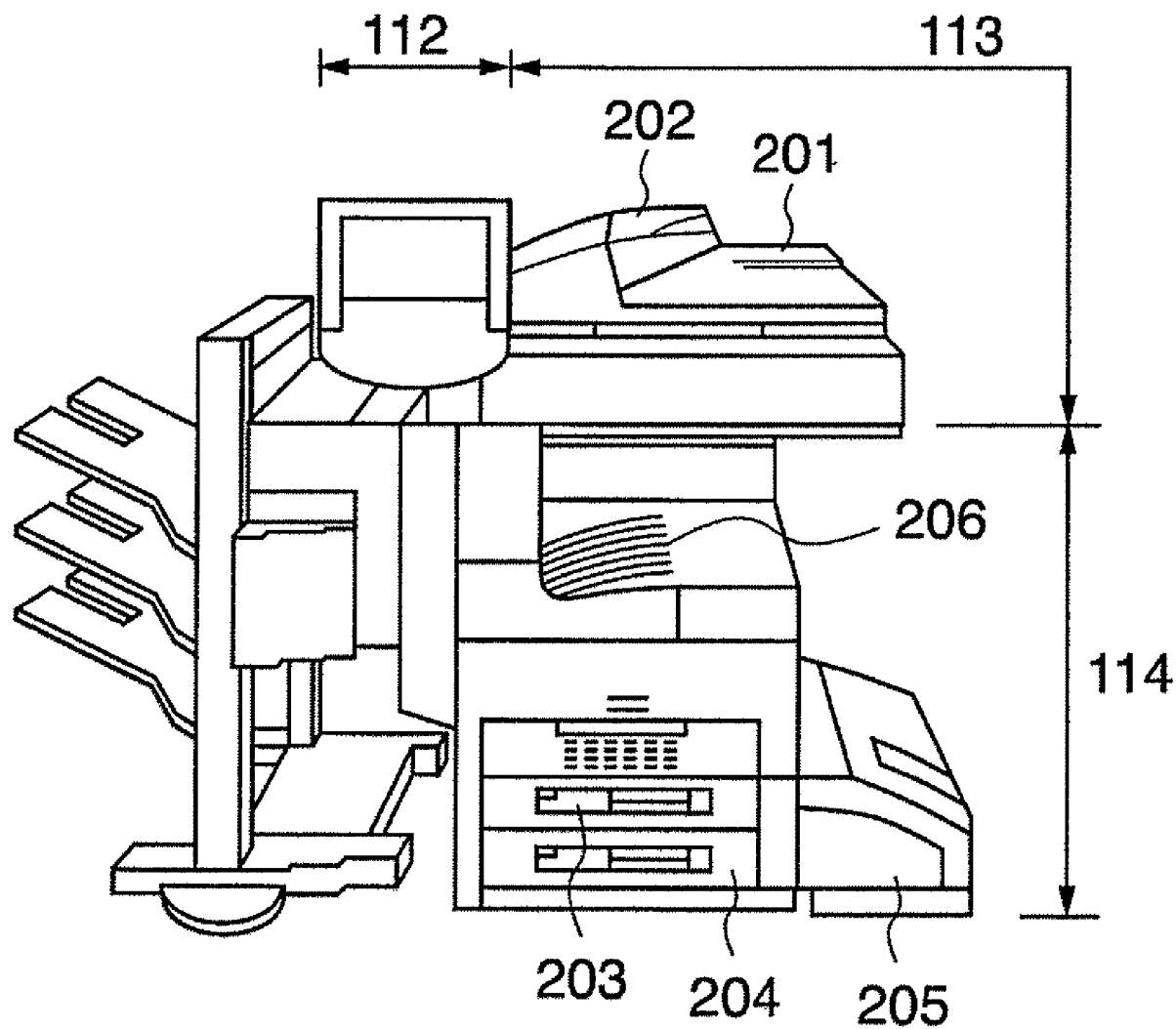
FIG. 2 is a view that shows the external appearance of an image forming apparatus according to the first embodiment.

FIG. 2 is a view that shows the external appearance of the image forming apparatus according to the first embodiment. The scanner unit 113 as an image input device shown in FIG. 2 has a plurality of CCDs. If the sensitivity of each CCD is different, even if the density of each pixel on an original is the same, the pixels will be recognized as having respectively different densities. Therefore, first, in the scanner unit 113, a white board (a board that is uniformly white) is exposed and scanned, and the amount of reflected light that is obtained by the exposure and scanning is converted into electrical signals and output to the control unit 111.

In this connection, a shading correcting unit shown in FIG. 5 inside the control unit 111 as described later recognizes differences in the sensitivity of each CCD based on the electrical signals obtained from the respective CCDs and scans an image on an original utilizing the differences in the recognized sensitivities to correct the values of the obtained electrical signals.

Further, when the shading correcting unit that is described later receives gain adjustment information from a CPU inside the control unit 111 that is described later, it carries out gain adjustment in accordance with that information. This gain adjustment is used for adjusting how to allocate the values of electrical signals obtained by exposing and scanning an original to luminance signal values from 0 to 255. By means of this gain adjustment it is possible to convert values of electrical signals obtained by exposing and scanning an original into high luminance signal value or low luminance signal values.

Next, the configuration for scanning an image on an original will be described. The scanner unit 113 converts information of an image on an original into electrical signals by inputting reflection light that is obtained by exposing and scanning the image into CCDs. Further, the scanner unit 113 converts the electrical signals into luminance signals comprising each of the colors R, G, and B, and outputs the luminance signals as image data to the control unit 111.

The originals are placed in a tray 202 of an original feeder 201. Upon a user entering an instruction to begin reading from the operation unit 112, an instruction to read the originals is issued from the control unit 111 to the scanner unit 113. Upon receiving this instruction, the scanner unit 113 feeds the originals, one at a time, from the tray 202 of the original feeder 201, and performs an operation to read the originals.

A method of reading an original is not limited to a method in which an original is automatically fed by the original feeder 201, and may be a method in which an operator places an original on an unshown glass surface to scan the original by causing an exposing unit to move.

The printer unit 114 is an image forming device that forms an image of image data that is received from the control unit 111 on a sheet. Although in this embodiment the image forming system of the printer unit 114 is an electrophotographic system that uses a photosensitive drum and a photosensitive member belt, the present invention is not limited thereto. For example, an inkjet system that discharges ink from an array of microscopic nozzles to print the ink on a sheet can be applied. Further, the printer unit 114 comprises a plurality of paper supply means that enable selection of different paper sizes or different paper orientations, and is provided with paper cassettes 203, 204, and 205 that respectively correspond to the plurality of paper supply means. Paper sheets that have undergone printing are discharged onto a discharge tray 206.

<Details of Control Unit 111 (FIG. 3)>

Figure 3:
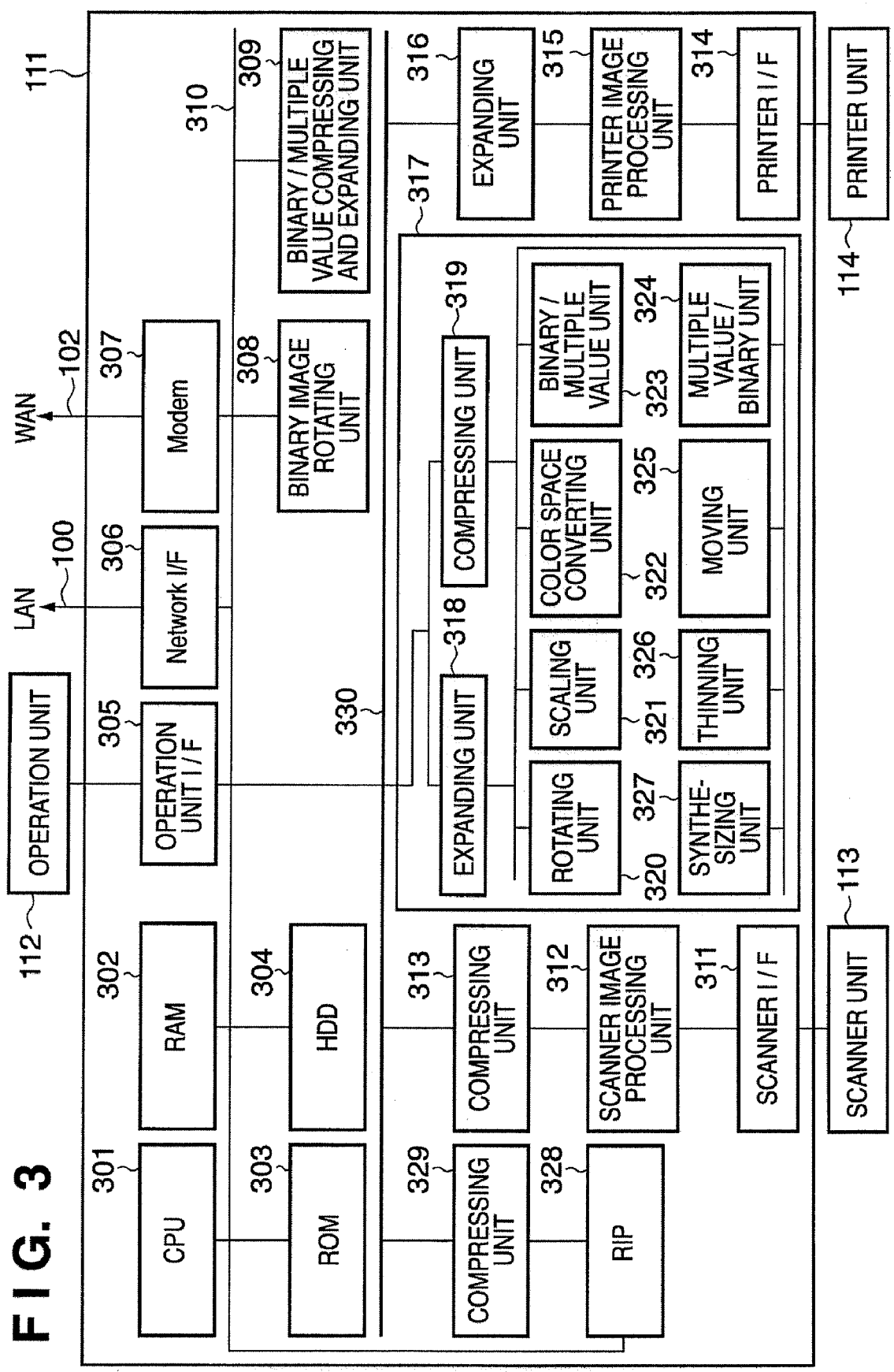
FIG. 3 is a block diagram showing the detailed configuration of a control unit 111 in the image forming apparatus 110.

FIG. 3 is a block diagram that shows the detailed configuration of the control unit 111 in the image forming apparatus 110. The control unit 111 is electrically connected to the scanner unit 113 and the printer unit 114. The control unit 111 is also connected to the PC 101 and external apparatuses or the like through the LAN 100 or the wide area network (WAN) 102. The control unit 111 carries out input and output of image data and device information.

In the control unit 111, a CPU 301 carries out overall control of access to various connected devices based on programs and the like that are stored in a ROM 303. The CPU 301 also carries out overall control for various kinds of processing that are performed internally. A RAM 302 is a system work memory used for operation of a CPU 301, and is also a memory for temporarily storing image data. The RAM 302 is composed by a SRAM that retains the stored contents after the power is turned off and a DRAM whose stored contents are erased after the power is turned off. A ROM 303 stores a boot program and control data of the apparatus. An HDD 304 is a hard disk drive that stores system software and image data.

An operation unit I/F 305 is an interface unit for connecting a system bus 310 and the operation unit 112. The operation unit I/F 305 receives image data for display on the operation unit 112 from the system bus 310 and outputs the image data to the operation unit 112. The operation unit I/F 305 also outputs information that is input from the operation unit 112 to the system bus 310.

A network I/F 306 is responsible for connection to the LAN 100, and performs input and output of information to and from the LAN 100. A modem 307 is responsible for connection to the WAN 102, and performs input and output of information to and from the WAN 102. A binary image rotating unit 308 changes the direction of the image data before sending a binary image with the modem 307. A binary/multiple value compressing and expanding unit 309 converts the resolution of image data before sending to a predetermined resolution or a resolution that conforms to the capability of the receiving party. The compression and expansion supports systems such as JBIG, MMR, MR, and MH.

An image bus 330 is a transmission line for exchanging image data, and consists of a PCI bus or an IEEE 1394. A scanner image processing unit 312 that is connected to the image bus 330 corrects, manipulates and edits image data that is received via the scanner I/F 311 from the scanner unit 113.

The scanner image processing unit 312 determines whether the image data that is received is from a color original or a black and white original, or is from a text original or a photograph original and the like. The scanner image processing unit 312 attaches the determination result to the image data. Hereafter, this attached information is referred to as "attribute data". The details of the processing that are performed in the scanner image processing unit 312 are described later.

A compressing unit 313 receives image data and divides the image data into block units of 32×32 pixels. This image data of 32×32 pixels is referred to as "tile image data."

FIG. 4 is a view that conceptually represents tile image data. A region that corresponds to this tile image data in an original (paper medium prior to reading) is called a "tile image". Average brightness information in the block of 32×32 pixels or coordinate positions on the tile image original are attached as header information to the tile image data.

The compressing unit 313 also compresses image data comprising a plurality of tile image data. An expanding unit 316 expands image data comprising a plurality of tile image data, and thereafter subjects the expanded image data to raster development and sends that data to a printer image processing unit 315.

The printer image processing unit 315 receives image data that is sent from the expanding unit 316 and performs image processing on the image data while referring to attribute data that is attached to the image data. The image data after image processing is output to the printer unit 114 via a printer I/F 314. The processing that is performed at the printer image processing unit 315 is described in detail later.

An image converting unit 317 performs predetermined conversion processing on image data. This processing unit is composed of the processing units described hereunder.

An expanding unit 318 expands received image data. A compressing unit 319 compresses received image data. A rotating unit 320 rotates received image data. A scaling unit 321 subjects received image data to resolution conversion processing to convert the resolution from, for example, 600 dpi to 200 dpi, or scaling processing from, for example, 25% to 400%. In this connection, prior to the scaling processing, an image of 32×32 pixels is sorted into images of 32 line units.

A color space converting unit 322 converts color spaces of the received image data. The color space converting unit 322 performs known background removal processing using a matrix or table, known LOG conversion processing (RGB→CMY), or known output color correction processing (CMY→CMYK). A binary/multiple value converting unit 323 converts image data of two shades that is received into image data of 256 shades. In contrast, a multiple value/binary converting unit 324 converts image data of 256 shades that is received into image data of 2 shades using a method such as error diffusion processing.

A synthesizing unit 327 synthesizes two pieces of image data that are received to generate one piece of image data. When synthesizing two pieces of image data, a method is applied that takes the mean value of the brightness values of the pixels of the synthesis targets as the synthesized brightness value or that takes the brightness value of the pixel that is brighter at the brightness level as the brightness value of the pixel after synthesis. It is also possible to utilize a method that takes the darker pixel as the pixel after synthesis. Furthermore, a method can be utilized that determines the brightness value after synthesis by subjecting the pixels of the synthesis targets to a logical OR operation, an AND operation, an exclusive-OR operation or the like. These synthesis methods are all known methods.

A thinning unit 326 performs resolution conversion by thinning pixels of received image data to generate image data of ½, ¼, or ⅛. A moving unit 325 attaches a margin portion to image data that is received or erases a margin portion therefrom.

A raster image processor (RIP) 328 receives intermediate data that is generated based on PDL code data that is sent from a PC 101 or the like, and develops the data into bitmap data (multiple values).

<Detailed Description of Scanner Image Processing Unit 312 (FIG. 5)>

Figure 5:
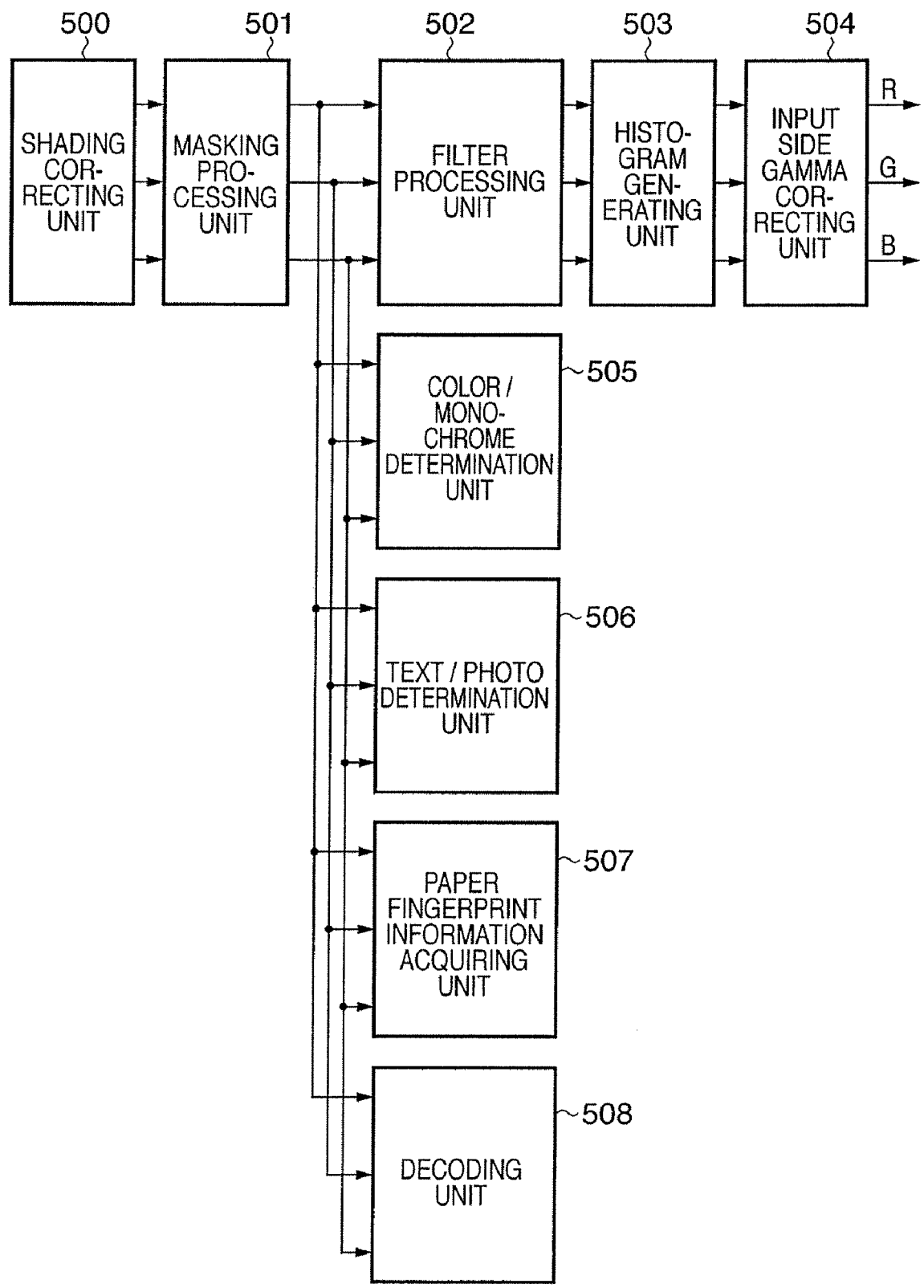
FIG. 5 is a block diagram showing one example of the configuration of the scanner image processing unit 312 shown in FIG. 3.

FIG. 5 is a block diagram showing one example of the configuration of the scanner image processing unit 312 shown in FIG. 3. The scanner image processing unit 312 receives luminance signals of 8 bits of RGB, respectively, as input image data. A shading correcting unit 500 performs shading correction with respect to these luminance signals. The term "shading correction" refers to, as described above, processing for preventing erroneous recognition of the brightness of an original caused by disparities in the sensitivities of CCDs. Further, as described above, the shading correcting unit 500 can perform gain adjustment upon an instruction from the CPU 301.

Next, the luminance signals that have undergone shading correction are converted into standard luminance signals that are not dependent on filter colors of CCDs by a masking processing unit 501. A filter processing unit 502 arbitrarily corrects the spatial frequency of image data that is received. More specifically, the filter processing unit 502 performs processing operations with respect to the received image data using, for example, a 7×7 matrix.

In the case of a copying machine or a multifunction device, by pressing an original selection tab 904 on an operating screen shown in FIG. 9 that is described later, any group consisting of a text mode, a photo mode, and a text/photo mode can be selected as a copy mode.

In this case, when the user selects the text mode the filter processing unit 502 applies a text filter to the entire image data. Further, when the user selects the photo mode the filter processing unit 502 applies a photo filter to the entire image data. Alternatively, when the user selects the text/photo mode, the filter processing unit 502 switches the filters in an adaptive manner for each pixel in accordance with a text/photo determination signal (one portion of attribute data) that is described later. More specifically, the filter processing unit 502 determines whether to apply a photo filter or a text filter for each pixel.

In this connection, for the photo filter a coefficient is set such that smoothing is performed for only high frequency components. This is done so as not to make the surface roughness of the image noticeable. For the text filter, a coefficient is set such that strong edge enhancement is performed. This is done to bring out the sharpness of the text.

A histogram generating unit 503 samples brightness data of each pixel constituting the received image data. More specifically, the histogram generating unit 503 samples brightness data within a rectangular region that is surrounded by a start point and an end point that are specified in each of the main scanning direction and the subscanning direction, at a constant pitch in the main scanning direction and the subscanning direction. The histogram generating unit 503 then generates histogram data based on the sampling result. The histogram data that is generated is used for estimating a background level when performing background removal processing. An input side gamma correcting unit 504 performs conversion into brightness data having non-linear characteristics utilizing a table or the like.

A color/monochrome determination unit 505 determines whether each pixel constituting received image data is a chromatic color or an achromatic color, and attaches the determination result to the image data as a color/monochrome determination signal (one part of attribute data).

A text/photo determination unit 506 determines whether each pixel constituting image data is a pixel that constitutes a character, a pixel that constitutes a dot, a pixel that constitutes a character among dots, or a pixel that constitutes a solid image based on the pixel value of each pixel and pixel values of the peripheral pixels to each pixel. The text/photo determination unit 506 attaches the result of this determination to the image data as a text/photo determination signal (one part of attribute data). In this case, a pixel that does not correspond to any of the above pixels is a pixel that constitutes a white region.

A paper fingerprint information acquiring unit 507 extracts image data of a predetermined region from input RGB image data as entanglements or bumps of random fibers (paper fingerprint) on the paper surface that are generated when producing the paper sheet.

Figure 6:
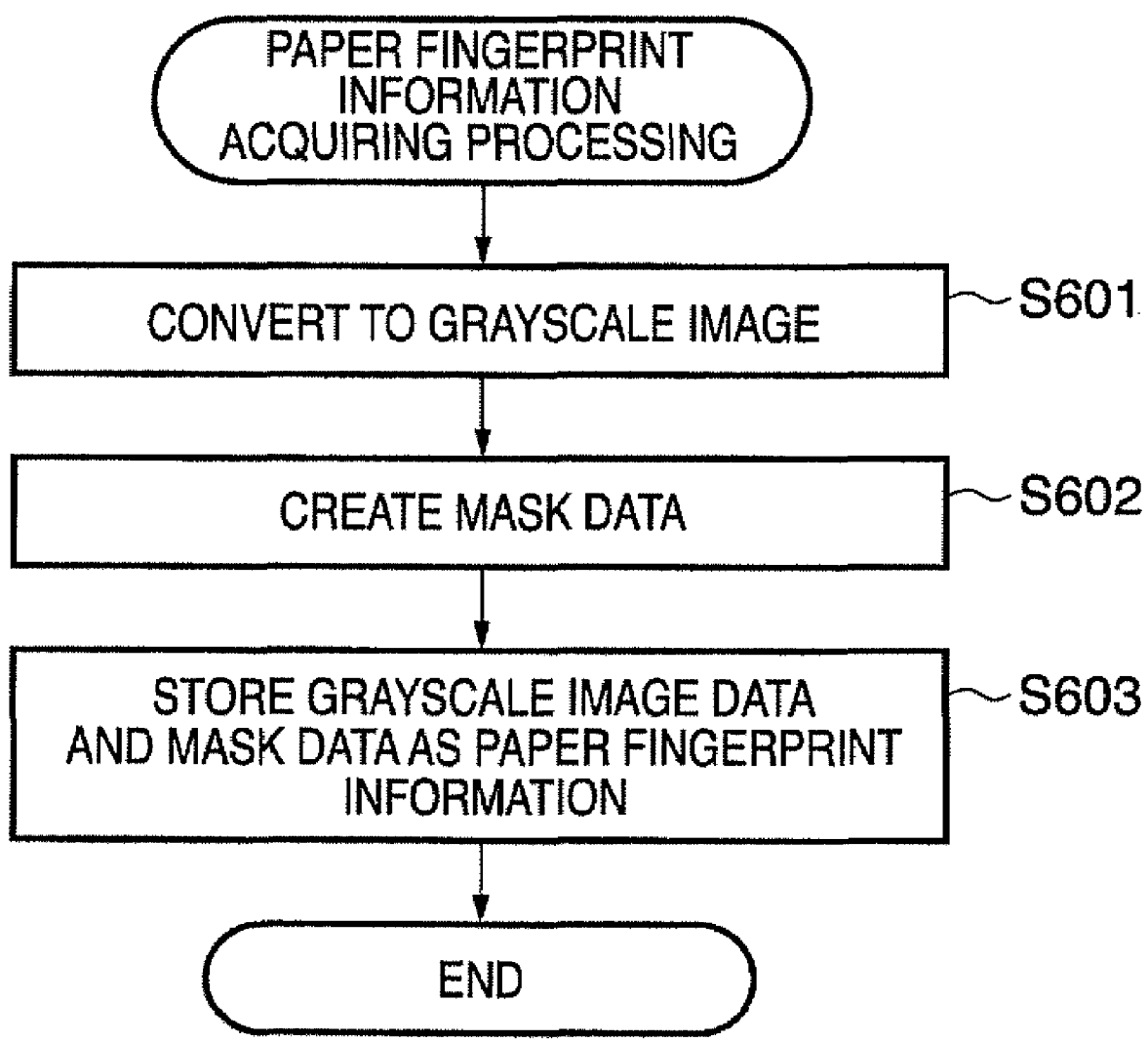
FIG. 6 is a flowchart that illustrates paper fingerprint information acquisition processing at a paper fingerprint information acquiring unit 507.

FIG. 6 is a flowchart that illustrates the procedure of paper fingerprint information acquisition processing in the paper fingerprint information acquiring unit 507. First, in step S601, the paper fingerprint information acquiring unit 507 converts image data that is extracted from a predetermined region into grayscale image data. Next, in step S602, the paper fingerprint information acquiring unit 507 generates mask data for removing items from the grayscale image data that could cause an erroneous determination, such as printed or handwritten characters. This mask data is binary data of "0" or "1". The mask data value is set to "1" for pixels whose luminance signal value is equal to or greater than a first threshold value (i.e. that are bright) in the grayscale image data. The mask data value is set to "0" for pixels whose luminance signal value is less than the first threshold value. This mask data generating processing is performed for all pixels included in the grayscale image data.

Subsequently, in step S03, the grayscale image data that is generated by conversion at step S601 and the mask data that is generated at step S602 are stored in the RAM 302 as paper fingerprint information. The paper fingerprint information acquiring unit 507 stores the paper fingerprint information of the aforementioned predetermined region in the RAM 302 via an unshown data bus.

Returning to FIG. 5, a decoding unit 508 determines whether or not coded image data exists within the image data that is output from the aforementioned masking processing unit 501. If coded image data exists, the decoding unit 508 decodes the coded image data to retrieve the information.

<Details of Printer Image Processing Unit 315 (FIG. 7)>

Figure 7:
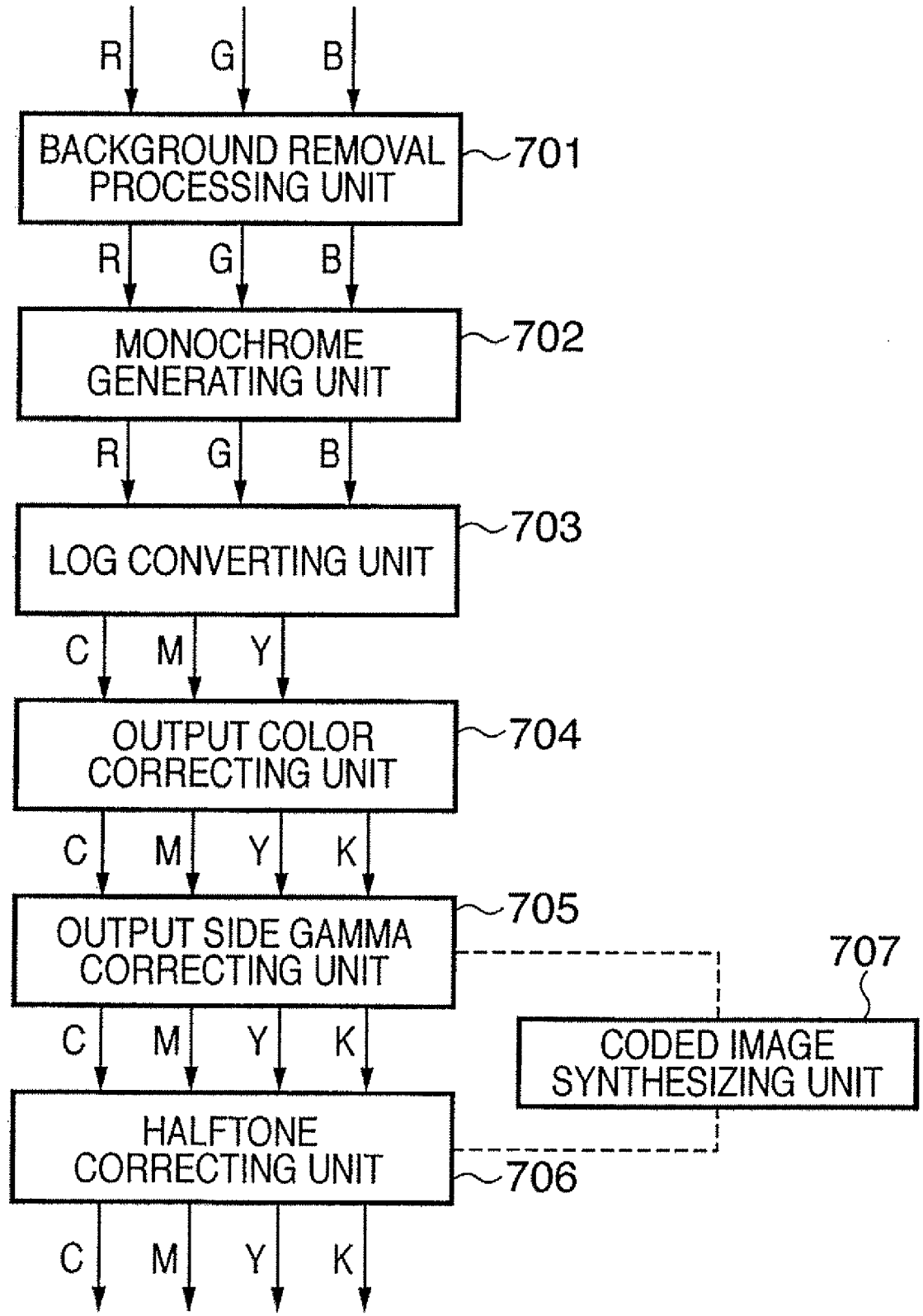
FIG. 7 is a block diagram showing one example of the configuration of a printer image processing unit 315 shown in FIG. 3.

FIG. 7 is a block diagram that shows one example of the configuration of the printer image processing unit 315 shown in FIG. 3. The background removal processing unit 701 removes background colors of input color image data using a histogram that is generated in the histogram generating unit 503 of the scanner image processing unit 312. A monochrome generating unit 702 converts input color image data into monochrome image data. The conversion to monochrome data is executed in accordance with the aforementioned color/monochrome determination signal. A log converting unit 703 performs brightness-density conversion for input image data. The log converting unit 703, for example, converts RGB image data into CMY image data.

An output color correcting unit 704 performs output color correction. For example, the output color correcting unit 704 converts CMY image data into CMYK image data using a table or a matrix. An output side gamma correcting unit 705 corrects CMYK image data so that values of the CMYK image data and reflection density values after copying and output are in proportion. A halftone correcting unit 706 performs halftone processing in conformity with the number of tones of the outputting printer unit. For example, the halftone correcting unit 706 converts received high-tone image data into binary data or 32-bit data.

A coded image synthesizing unit 707 synthesizes (original) image data that is corrected at the output side gamma correcting unit 705 and coded image data that is generated in <paper fingerprint information coding processing> that is described later.

In this connection, at each processing unit of the scanner image processing unit 312 or the printer image processing unit 315, the received image data may be output without performing each processing. Causing data to pass through a certain processing unit without performing processing is expressed below as "passing data through a processing unit".

<Paper Fingerprint Information Coding Processing>

The CPU 301 reads out paper fingerprint information of a predetermined region that is stored in the RAM 302 in the paper fingerprint information acquiring unit 507, and subjects this paper fingerprint information to coding processing to generate coded image data.

According to the first embodiment, the term "coded image" refers to an image such as a two-dimensional code image or a barcode image.

Further, the CPU 301 sends the coded image data that is generated to the coded image synthesizing unit 707 inside the printer image processing unit 31 using an unshown data bus.

The aforementioned coding processing and sending processing are performed by the CPU 301 executing programs stored inside the RAM 302.

<Paper Fingerprint Information Verification Processing>

The CPU 301 reads out paper fingerprint information that is stored in the RAM 302 using the paper fingerprint information acquiring unit 507, and verifies that paper fingerprint information against other paper fingerprint information.

The term "other paper fingerprint information" refers to paper fingerprint information included in the coded image data or paper fingerprint information that is registered in a server (not shown) that is connected to the LAN 100. A method of extracting paper fingerprint information that is included inside the coded image data is explained in <paper fingerprint extracting processing> described later.

Figure 8:
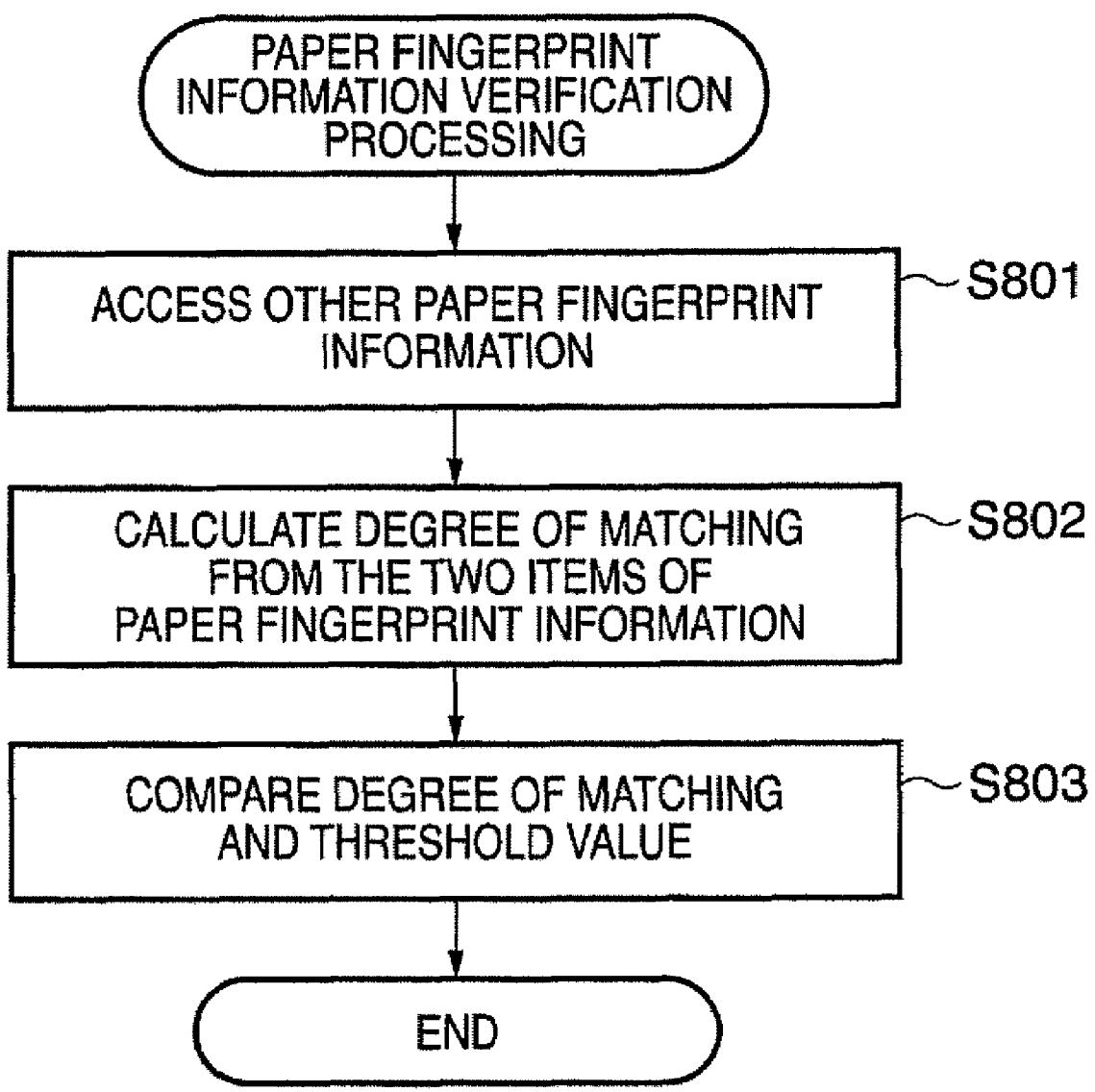
FIG. 8 is a flowchart that illustrates paper fingerprint information verification processing according to the first embodiment.

FIG. 8 is a flowchart that illustrates the procedure of paper fingerprint information verification processing according to the first embodiment. The overall control of this processing is performed by the CPU 301.

First, in step S801, the CPU 301 reads out paper fingerprint information included in coded image data or paper fingerprint information registered at a server.

$$E(i, j) = \frac{\sum_{x,y} \alpha_1(x, y)\alpha_2(x - i, y - j)\{f_1(x, y) - f_2(x, y)\}^2}{\sum_{x,y} \alpha_1(x, y)\alpha_2(x - i, y - j)} \quad (1)$$

In formula (1), $\alpha_1$ represents mask data in paper fingerprint information (that has been registered) that is extracted in step S801. $f_1$ represents grayscale image data in paper fingerprint information (that has been registered) that is extracted in step S801. $\alpha_2$ represents mask data in paper fingerprint information (extracted in the current operation) that is sent from the paper fingerprint information acquiring unit 507 in step S802. $f_2$ represents grayscale image data in paper fingerprint information (extracted in the current operation) that is sent from the paper fingerprint information acquiring unit 507 in step S802.

Figure 14A:
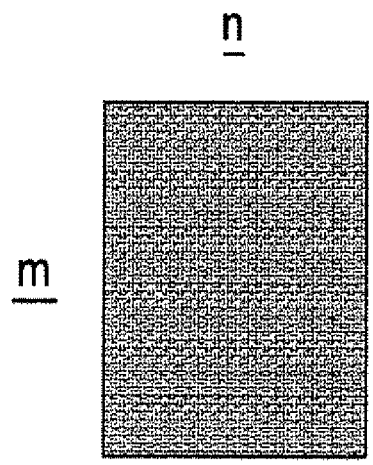
FIG. 14A is a view showing paper fingerprint information that is registered.
Figure 14B:
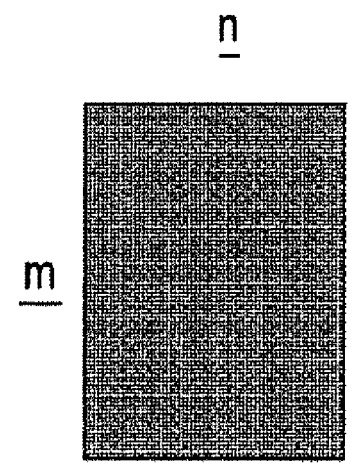
FIG. 14B is a view showing paper fingerprint information that was acquired with the current reading operation.

A specific method will now be described using FIG. 14A to FIG. 17B. FIG. 14A is a view showing a conceptual illustration of paper fingerprint information that is registered, and FIG. 14B is a view showing a conceptual illustration of paper fingerprint information that is obtained by the current operation. It is assumed that the information in each drawing consists of n pixels laterally and m pixels vertically.

In the function shown in the above described formula (1), i and j are respectively shifted for each pixel in the range of −n+1 to n−1 and −m+1 to m−1 to determine error values E(i,j) between the paper fingerprint information that has been registered and paper fingerprint information that is obtained in the current operation for (2n−1)×(2m−1) items. That is, E(−n+1, −m+1) to E(n−1, m−1) are determined.

FIG. 15A is a view showing a conceptual illustration of a state in which only one pixel on the lower right of the paper fingerprint information that is obtained in the current operation overlaps with one pixel on the upper left of the registered paper fingerprint information. In this state, the value obtained by the function of the above described formula (1) is taken as E(−n+1, −m+1). FIG. 15B is a view showing a conceptual illustration of a state in which the paper fingerprint information that is obtained in the current operation is moved to the right by the amount of one pixel only in comparison to the state shown in FIG. 15A. In this state, the value obtained by the function of the above described formula (1) is taken as E(−n+2, −m+1). Operations are likewise performed while moving the paper fingerprint information that is obtained in the current operation. In FIG. 15C, the paper fingerprint information that is obtained in the current operation is moved to a point at which it overlaps with the paper fingerprint information that is registered, and E(0, −(m−1)) is thereby obtained. Further, in FIG. 15D, the paper fingerprint information that is obtained in the current operation is moved as far as the right edge, and E(n−1, −m+1) is thereby obtained. By shifting the paper fingerprint information that is obtained in the current operation in the lateral direction in this manner, i of E(i,j) is incremented by one each time.

Figures 16A, 16B:
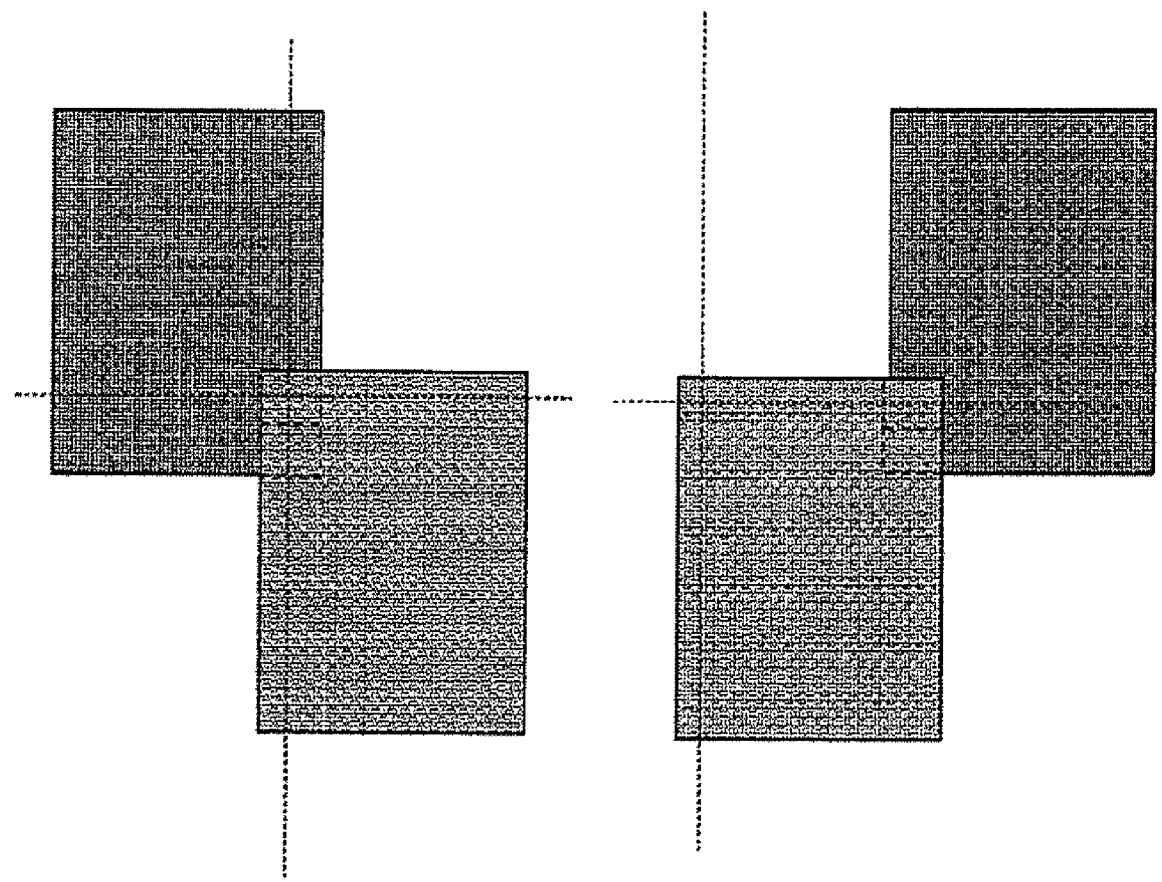
FIG. 16A is a view illustrating the way of determining $E_{1 \times 2}$.
FIG. 16B is a view illustrating the way of determining $E_{2n-1 \times 2}$.

Likewise, in FIG. 16A, the paper fingerprint information that is obtained in the current operation is moved upward in the vertical direction by only a single pixel in comparison to FIG. 15A, to obtain the value for E(−n+1, −m+2).

Further, in FIG. 16B, the paper fingerprint information that is obtained in the current operation is moved as far as the right edge in comparison to the state shown in FIG. 16A to obtain the value for E(n−1, −m+2).

Figure 17A:
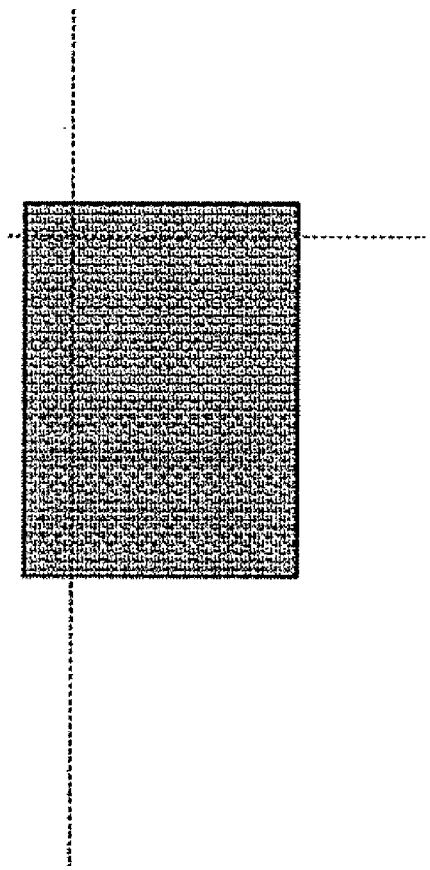
FIG. 17A is a view illustrating the way of determining $E_{n \times m}$.

FIG. 17A shows a case in which the paper fingerprint information that is registered and the paper fingerprint information that is obtained in the current operation are in the same position. The value for E(i,j) at this time is taken as E(0,0).

Figure 17B:
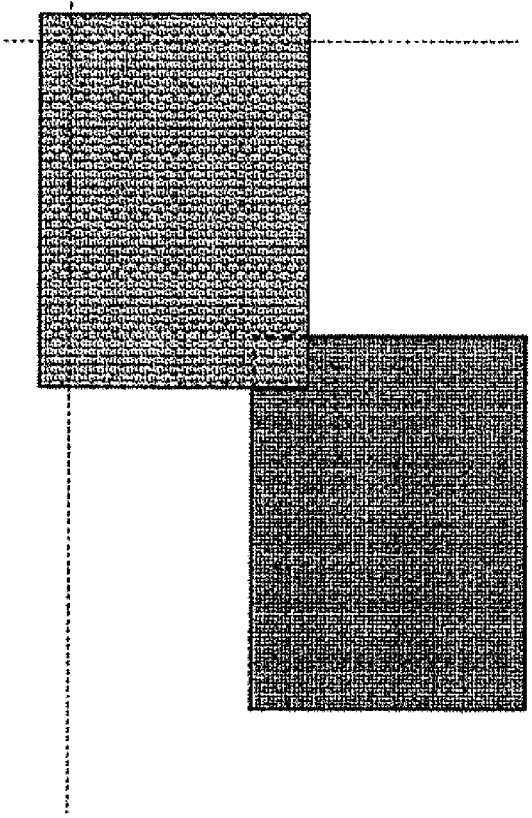
FIG. 17B is a view illustrating the way of determining $E_{2n-1 \times 2m-1}$.

Operations are likewise performed while shifting the images so that each type of paper fingerprint information overlaps at one or more pixels. Finally, E(n−1, m−1) is obtained as shown in FIG. 17B.

Thus, a set of (2n−1)×(2m−1) error values E(i,j) is obtained.

In this case, to consider the meaning of the above described formula (1), a case is considered in which i=0 and j=0, $\alpha_1$(x, y)=1 (where, x=0 to n, y=0 to m), and $\alpha_2$(x−i, y−j)=1 (where, x=0 to n, y=0 to m). That is, E(0,0) is determined for a case in which $\alpha_1$(x,y)=1 (where, x=0 to n, y=0 to m) and $\alpha_2$(x−i, y−j)=1 (where, x=0 to n, y=0 to m).

In this connection, i=0 and j=0 indicate that, as shown in FIG. 17A, the registered paper fingerprint information and the paper fingerprint information that is obtained in the current operation are in the same position.

In this case, $\alpha_1$(x,y)=1 (where, x=0 to n, y=0 to m) indicates that all of the pixels of the registered paper fingerprint information are clear. In other words, it indicates that no color material such as toner or ink or foreign matter of any kind is on the paper fingerprint acquisition region when the registered paper fingerprint information is acquired.

Further, $\alpha_2$(x−i, y−j)=1 (where, x=0 to n, y=0 to m) indicates that all of the pixels of the paper fingerprint information that is acquired in the current operation are clear. In other words, it indicates that no color material such as ink or toner or foreign matter of any kind is on the paper fingerprint acquisition region when the paper fingerprint information that has been acquired in the current operation is acquired.

Thus, when $\alpha_1$(x,y)=1 and $\alpha_2$(x−i, y−j)=1 hold true for all of the pixels, the above formula (1) is represented by the following formula.

$$E(0, 0) = \sum_{x=0, y=0}^{n,m} \{f_1(x, y) - f_2(x, y)\}^2$$

Here, $\{f_1(x,y)-f_2(x,y)\}^2$ indicates the squared value of the difference between grayscale image data in the registered paper fingerprint information and the grayscale image data in paper fingerprint information that is extracted in the current operation. Accordingly, formula (1) is a formula that sums the squares of differences between each pixel in the two kinds of paper fingerprint information. In other words, the greater the number of pixels for which $f_1$(x,y) and $f_2$(x,y) are similar, the smaller the value that E(0,0) takes.

Although the method of determining E(0,0) is described above, other E(i,j) values are determined in the same way. In this connection, since E(i,j) takes a smaller value as the number of pixels for which $f_1$(x,y) and $f_2$(x,y) are similar increases, it is found that when E(k,l)=min {E(i,j)}, the position when the registered paper fingerprint information is acquired and the position when acquiring the paper fingerprint information that is acquired in the current operation are out of alignment with each other by k,l.

<Meaning of α>

The numerator of the above described formula (1) means the result obtained after α1 and α2 are applied to $\{f_1(x,y)-f_2(x-i, y-j)\}^2$ (more exactly, a total value is determined by the Σ symbol). In this case, α1 and α2 indicate 0 for a pixel with a dark color and 1 for a pixel with a light color.

Accordingly, when either of (or both) $\alpha_1$ and $\alpha_2$ is 0, $\alpha_1 \cdot \alpha_2 \{f_1(x,y)-f_2(x-i, y-j)\}^2$ is 0.

More specifically, this indicates that when a target pixel in either (or both) of the two kinds of paper fingerprint information is a dark color, a difference in the density for that pixel is not considered. This is done in order to disregard pixels on which there is foreign matter or a color material.

Since the number that is totaled by the $\Sigma$ symbol increases and decreases by this processing, normalization is performed by dividing by the total number $\Sigma \alpha_1(x,y) \, \alpha_2(x-i, y-j)$. In this connection, it is assumed that error values $E(i,j)$ for which $\Sigma \alpha_1(x,y) \, \alpha_2(x-i, y-j)$ in the denominator of the above described formula (1) is 0 are not included in the set of error values $(E(-(n-1),-(m-1)$ to $E(n-1,m-1))$ described later.

<Method of Determining Degree of Matching>

As described above, it is found that when $E(k,l)=\min\{E(i,j)\}$, the position when the registered paper fingerprint information is acquired and the position when acquiring the paper fingerprint information that is acquired in the current operation are out of alignment with each other by k,l.

Next, a value that indicates to what degree the two kinds of paper fingerprint information resemble each other (this value is referred to as "degree of matching") is determined using that $E(k,l)$ and a different $E(i,j)$.

First, a mean value (40) is obtained from the set of error values that are determined by the function in (1) (for example, $E(0,0)=10^*, E(0,1)=50, E(1,0)=50, E(1,1)=50)$. . . . (A)

In this connection * is not related to a value. It is described here only to draw attention to this figure. The reason for wanting to draw attention to this figure is described later.

Next, error values (10*, 50, 50, 50) are subtracted from the mean value (40) to obtain a new set (30*, −10, −10, −10). . . . (B)

The standard deviation $(30 \times 30 + 10 \times 10 + 10 \times 10 + 10 \times 10 = 1200,$ $1200/4=300,$ $\sqrt{300}=10\sqrt{3}=$approximately 17) is determined from this new set. The aforementioned new set is then divided by 17 to obtain the quotient (1*, −1, −1, −1). . . . (C)

The highest value among the obtained values is taken as the degree of matching (1*). This value 1* is a value that corresponds to the value $E(0,0)=10^*$. $E(0,0)$ is a value that, in this case, satisfies $E(0,0)=\min\{E(i,j)\}$.

<Conceptual Explanation of Method of Determining Degree of Matching>

The processing that carries out the above described method of determining the degree of matching ultimately calculates to what degree the smallest error value in a set of multiple error values is separate from the mean error value (A and B).

The degree of matching is then determined by dividing this degree of separation by the standard deviation (C).

Finally, a verification result is obtained by comparing the degree of matching with a threshold value (D).

In this connection, the term "standard deviation" refers to the mean value for "the difference between each error value and the mean value". In other words, the standard deviation is a value that indicates substantially how much of a variation occurs overall in the set.

By dividing the above described degree of separation by a value for the overall variation in this way, it is possible to find out how small $\min\{E(i,j)\}$ is within the set $E(i,j)$ (prominently small or a little small).

When $\min\{E(i,j)\}$ is extremely (prominently) small among the values in the set $E(i,j)$ the degree of matching is determined to be valid. In other cases the degree of matching is determined to be invalid (D).

<Reason for Determination to be Valid Only when $\min\{E(I,j)\}$ is Extremely (Prominently) Small Among the Values in the Set $E(i,j)$>

In the following description, it is assumed that the registered paper fingerprint information and the paper fingerprint information that is acquired in the current operation are acquired from the same paper sheet.

Hence, there should be a place (shift position) at which the registered paper fingerprint information and the paper fingerprint information that is acquired in the current operation match to an extremely high degree. At this time, in order for the registered paper fingerprint information and the paper fingerprint information that is acquired in the current operation to match to an extremely high degree at the shift position, $E(i,j)$ should be extremely small.

In contrast, at a position that deviates even slightly from the shift position, any relationship between the registered paper fingerprint information and the paper fingerprint information that is acquired in the current operation ends. Accordingly, $E(i,j)$ should normally be a large value.

For this reason, a condition that "the two kinds of paper fingerprint information are acquired from the same paper sheet" matches a condition that "the smallest $E(i,j)$ is prominently small within the set $E(i,j)$."

The description will now return to <paper fingerprint information verification processing>.

At step S803, the degree of matching between the two kinds of paper fingerprint information that is obtained at step S802 is compared with a predetermined threshold value to determine whether the degree of matching is "valid" or "invalid". In this connection, "degree of matching" may also be referred to as "similarity". Further, the result of comparison between the degree of matching and the predetermined threshold value may also be referred to as "verification result".

<Description of Operating Screen>

Next, processing in which the user registers and verifies paper fingerprint information from a screen displayed on the operation unit 112 of the image forming apparatus 110 will be described using FIG. 9 to FIG. 11.

Figure 9:
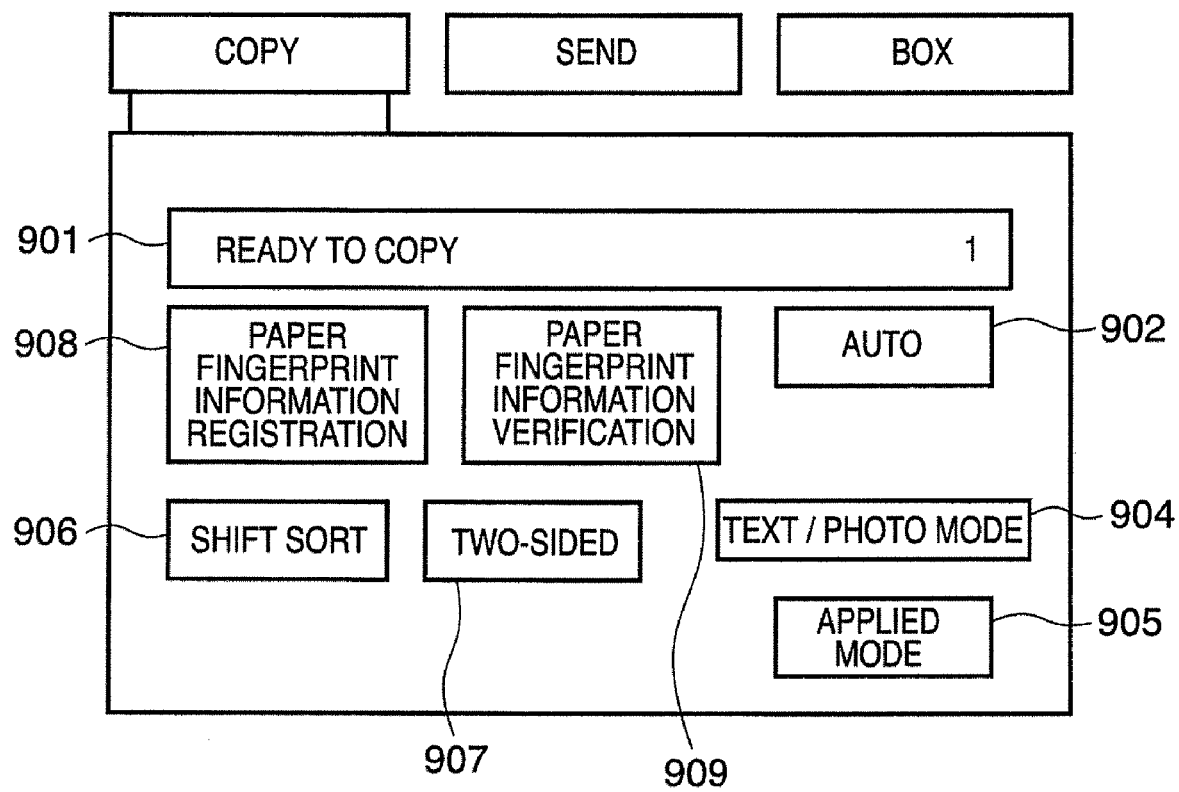
FIG. 9 is a view that shows one example of an initial screen in the image forming apparatus 110.

FIG. 9 is a view showing one example of an initial screen on the image forming apparatus 110. A region 901 shows whether or not the image forming apparatus 110 is in a state in which copying can be performed, as well as the number of copies that is set. An original selection tab 904 is a tab for selecting the type of original. When this tab is pressed, a selection menu allowing selection of three kinds of modes consisting of a text mode, a photo mode, and a text/photo mode is displayed as a popup menu.

A finishing tab 906 is a tab for making settings relating to various kinds of finishing. A two-sided settings tab 907 is a tab for making settings related to two-sided reading and two-sided printing. A read mode tab 902 is a tab for selecting a mode for reading an original. When the read mode tab 902 is pressed, a menu to select among three kinds of modes consisting of color/black/automatic (ACS) is displayed as a popup menu. When color is selected, color copying is performed and when black is selected black and white copying is performed. When ACS is selected, the copy mode is determined by the above described monochrome/color determination signal.

A paper fingerprint information registration tab 908 is a tab for selecting paper fingerprint information registration processing as the read mode. This registration processing is described in detail later. A paper fingerprint information verification tab 909 is a tab for selecting paper fingerprint information verification processing as the read mode. This verification processing is described in detail later.

<Paper Fingerprint Information Registration Processing>

Paper fingerprint information registration processing that is executed when the user presses the paper fingerprint information registration tab 908 and then presses the start key will now be described using FIG. 10.

Figure 10:
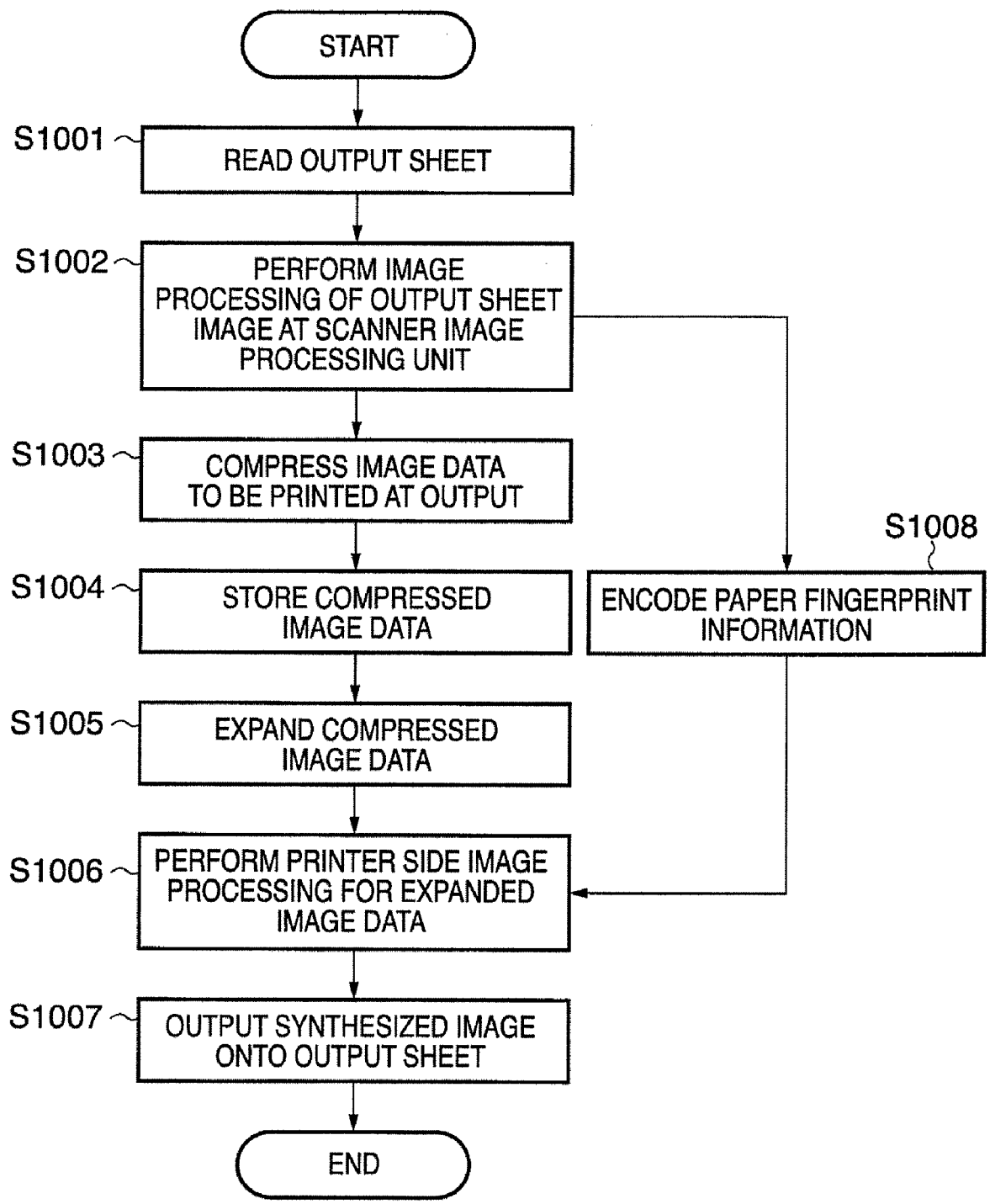
FIG. 10 is a flowchart that illustrates paper fingerprint information registration processing according to the first embodiment.

FIG. 10 is a flowchart that shows the procedure of paper fingerprint information registration processing in the first embodiment. First, in step S1001, the CPU 301 sends image data that is acquired by reading a paper sheet to be used in image formation (output sheet of white paper) with the scanner unit 113 to the scanner image processing unit 312 via the scanner I/F 311. After the output sheet is read at step S1001, the sheet is placed in a manual feed tray or the paper cassettes 203 to 205 by the user.

In step S1002, the scanner image processing unit 312 sets a gain adjustment value that is smaller than a gain adjustment value at the time of normal reading in the shading correcting unit 500. The scanner image processing unit 312 then outputs to the paper fingerprint information acquiring unit 507 respective luminance signal values that are obtained by applying the small gain adjustment value that is set to the image data. Thereafter, the paper fingerprint information acquiring unit 507 acquires paper fingerprint information based on the output data. The paper fingerprint information that is acquired is stored in the RAM 302 using an unshown data bus.

In step S1008, the CPU 301 encodes the paper fingerprint information that is stored in the RAM 302 to generate coded image data, and sends the coded image data that is generated to the coded image synthesizing unit 707 inside the printer image processing unit 315.

Next, processing that is performed when rendering PDL data to print on an output sheet will be described. First, network packet data that is transferred from the PC 101 via the LAN 100 is stored in the RAM 302 via the network I/F 306. The CPU 301 analyzes the packet data, extracts the PDL data, and stores the PDL data in the HDD 304. The CPU 301 then retrieves the PDL data from the HDD 304 again to perform rendering at the RIP unit 328.

In step S1003, the compressing unit 313 divides the new image data that is generated at the RIP unit 328 into block units of 32×32 pixels to generate tile data. The compressing unit 313 also compresses image data that comprises this plurality of tile data.

Next, in step S1004 the CPU 301 stores the image data that is compressed by the compressing unit 313 in the RAM 302. As necessary, this image data can be sent to the image converting unit 317, and then sent to the RAM 302 to be stored again after image processing is performed.

In step S1005, the CPU 301 sends the image data that is stored in the RAM 302 to the expanding unit 316. At this time, the expanding unit 316 expands the image data. The expanding unit 316 also carries out raster development of image data comprising a plurality of tile data after expansion. The image data after raster development is sent to the printer image processing unit 315.

At step S1006, the printer image processing unit 315 edits the image data in accordance with attribute data that is attached to the image data. This processing was described above using FIG. 7. In this case, the coded image data that is generated at step S1008 and the image data (of the original) are synthesized.

More specifically, the coded image synthesizing unit 707 synthesizes the image data (of the original) that is sent from the output side gamma correcting unit 705 and the coded image data that is generated at step S1008. The halftone correcting unit 706 then subjects the synthesized image data that is obtained by the synthesis to halftone processing in conformity with the number of tones of the output printer unit 114. The synthesized image data after halftone processing is sent to the printer unit 114 via the printer I/F 314.

Subsequently, in step S1007 the printer unit 114 performs image formation on the output sheet based on the synthesized image data. The purpose of the coded image data will now be explained. For example, when an output sheet on which an image of the synthesized image data is formed is copied using a copying machine, the coded image data is also copied. In this case, the output sheet on which the image of the synthesized image data is formed is a different paper sheet to the paper sheet onto which the image is copied. Accordingly, the paper fingerprint information that is in accordance with the coded image data on the paper sheet onto which the image is copied will naturally no longer match a paper fingerprint of the paper sheet onto which the image is copied that is obtained from the bumps on the paper sheet onto which the image is copied. Thus, the coded image data can be utilized to certify the authenticity of that paper sheet (to determine whether that paper sheet is a paper sheet onto which an image is copied). In this connection, coordinate information that shows the position on the paper sheet that the paper fingerprint in accordance with the coded image data is obtained from may also be included in the coded image data.

<Paper Fingerprint Information Verification Processing>

Figure 11:
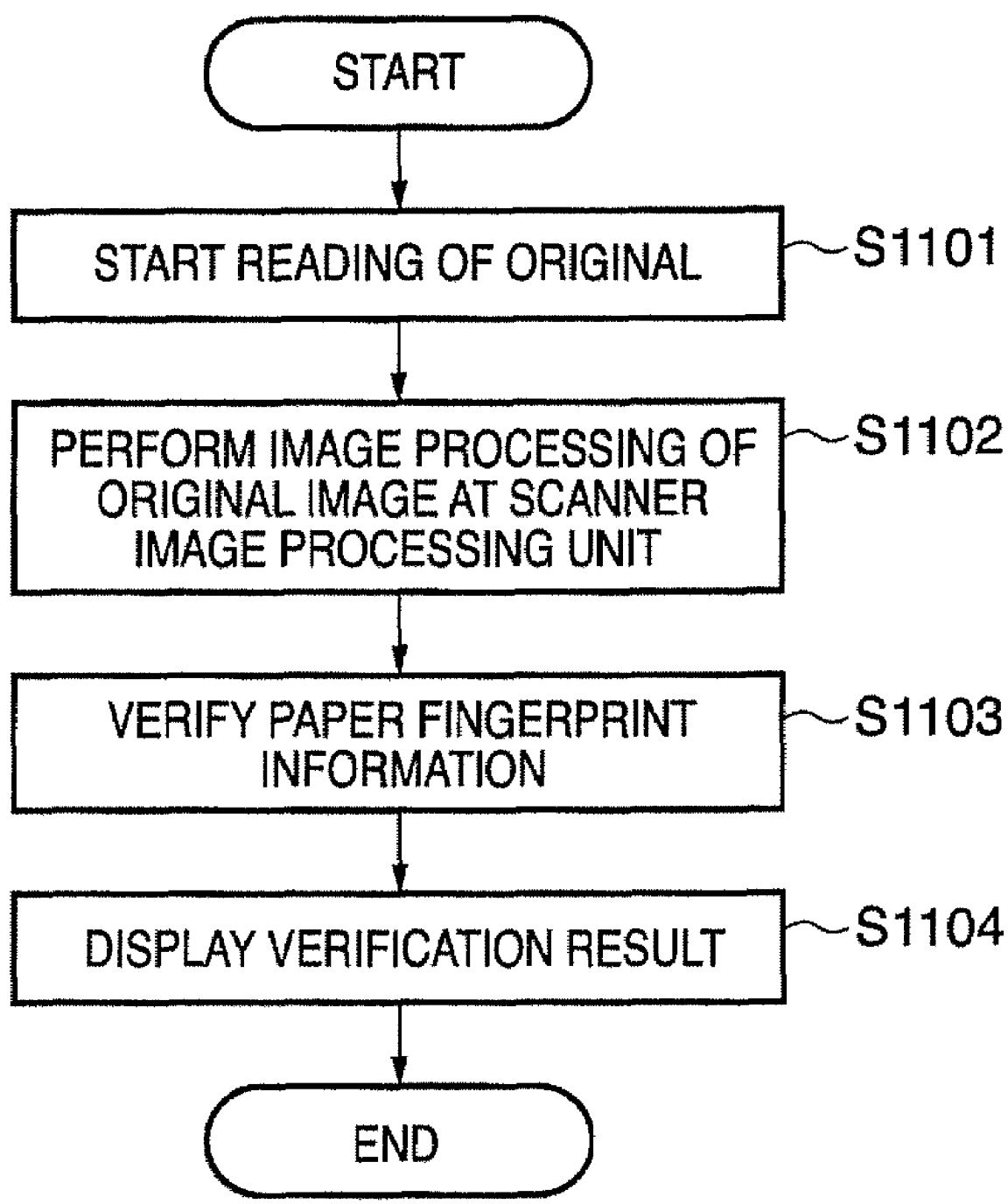
FIG. 11 is a flowchart that illustrates paper fingerprint information verification processing according to the first embodiment.

Next, paper fingerprint information verification processing that is executed when the user presses the paper fingerprint information verification tab 909 shown in FIG. 9 and then presses the start key is described using FIG. 11.

FIG. 11 is a flowchart that shows the procedure of paper fingerprint information verification processing in the first embodiment. First, in step S1101, the CPU 301 sends an original that is read by the scanner unit 113 to the scanner image processing unit 312 via the scanner I/F 311 as image data. Subsequently, in step S1102, the scanner image processing unit 312 performs the processing shown in FIG. 5 with respect to this image data to generate new image data along with attribute data. The scanner image processing unit 312 also attaches the attribute data to the image data.

Further, at step S1102, the paper fingerprint information acquiring unit 507 inside the scanner image processing unit 312 acquires paper fingerprint information. In this connection, in order to acquire the paper fingerprint information, control such as performing gain adjustment for the shading correcting unit 500 is performed as described above. The acquired paper fingerprint information is stored in the RAM 302 using an unshown data bus.

Further, in step S1102, when a coded image exists inside the original that is read, the decoding unit 508 inside the scanner image processing unit 312 decodes the coded image to acquire information. The acquired information is then stored in the RAM 302 using an unshown data bus.

In step S1103, the CPU 301 performs paper fingerprint information verification processing. This paper fingerprint information verification processing is performed as described in <paper fingerprint information verification processing> with reference to FIG. 8.

In step S1104, the CPU 301 displays the result (valid or invalid) obtained by the <paper fingerprint information verification processing> on a display screen of the operation unit 112.

According to the first embodiment, when the user selects to acquire paper fingerprint information, paper fingerprint information can be acquired by adjusting the gain of the shading correcting unit 500.

Second Embodiment

Next, the second embodiment according to the present invention is described in detail while referring to the drawings. According to the second embodiment, a case of a scanner in which the scanner unit 113 is capable of simultaneously reading both sides of a sheet is described. In this case, the front surface of an output sheet is used for normal image printing or normal scanning, and the rear surface is used for acquiring and verifying paper fingerprint information. First, registration of paper fingerprint information will be described. The rear surface of a paper sheet (output sheet) for registering paper fingerprint information is read by the scanner unit 113 as in the first embodiment, paper fingerprint information with respect to the read image data is acquired, and that paper fingerprint information is encoded and stored in the RAM 302. Subsequently, when printing PDL data or image data to be duplicated on the aforementioned output sheet using the printer unit 114, the coded image data of the paper fingerprint information that is previously stored in the RAM 302 is printed on the rear surface of that output sheet. Naturally, in this case, the printer unit 114 has an inverting mechanism for inverting the output sheet, PDL data or image data to be duplicated is formed on the front surface of the output sheet, and after inverting the output sheet utilizing this inverting mechanism, the coded image data is printed on the rear surface thereof. By the above processing it is possible to form PDL data or image data to be duplicated on the front surface of the output sheet and to register paper fingerprint information of the rear surface of the output sheet.

The system configuration according to the second embodiment is the same as the first embodiment as shown in FIG. 1. The external appearance of the image forming apparatus and the configuration of the control unit are also the same as in the first embodiment.

Figure 12:
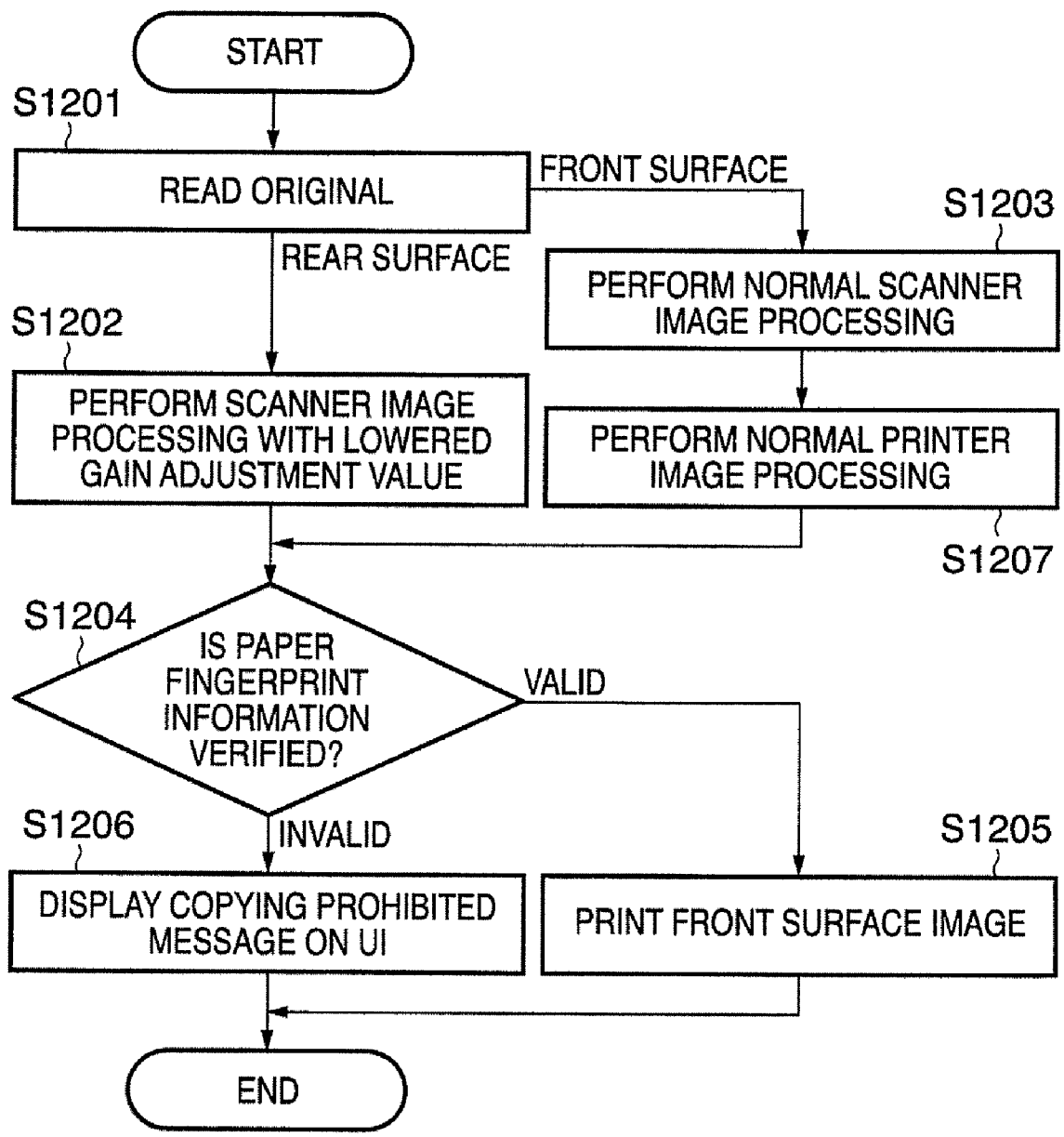
FIG. 12 is a flowchart that illustrates verification processing that verifies paper fingerprint information using a scanner that is capable of simultaneously reading both sides of a paper sheet.

FIG. 12 is a flowchart illustrating the procedure of verification processing in which a paper sheet that is a target for reading is conveyed one time by an original feeder 201 and paper fingerprint information is verified by a scanner that is capable of reading the both sides of that paper sheet. This two-sided reading is implemented by disposing in the original feeder 201 a scanner that scans the rear surface of a paper sheet (original) during conveying by (in the conveying path of) the original feeder 201. First, in step S1201, an instruction is issued to the scanner unit 113 and reading of an original starts. The processing of step S1202 and step S1203 are then performed simultaneously. In step S1202, the scanner image processing unit 312 sets a gain adjustment value that is smaller than the gain adjustment value at a time of normal reading in the shading correcting unit 500, and performs scanner image processing that includes gain adjustment processing with respect to image data of the rear surface of an original that is read.

Meanwhile, at step S1203, the scanner image processing unit 312 sets the gain adjustment value for normal reading in the shading correcting unit 500, and performs scanner image processing that includes gain adjustment processing with respect to image data in accordance with the front surface of the original that is read. Next, in step S1207, normal printer image processing (see FIG. 7, 701 to 705, and 706) is performed with respect to image data in accordance with the front surface of the original. Naturally, gain adjustment may be performed using a gain adjustment circuit that is separate from the shading correcting unit 500.

Next, in step S1204, paper fingerprint information that is acquired from the rear surface of the original is verified. In this case, if the paper fingerprint information verification result is valid (paper fingerprint is verified), the processing proceeds to step S1205 to perform printing on the output sheet in accordance with the image data of the front surface of the original. In contrast, if the paper fingerprint information verification result is invalid (paper fingerprint is not verified), the processing advances to step S1206 to display a message to the effect that copying is prohibited on the user interface (UI).

In the present embodiment, a configuration is adopted in which an original for which a paper fingerprint is verified can be printed (copied). However, a paper fingerprint of an original for which it is desired to prohibit duplication can be previously registered, and a control can be set in the apparatus to prohibit duplication when that paper fingerprint is verified, so that printing (copying) is prohibited when the paper fingerprint is verified.

According to the second embodiment, gain adjustment values with respect to read signals of the front surface and rear surface of an original are separately controlled. It is thus possible, with one scanning operation, to use the rear surface of an original for verifying paper fingerprint information and to perform normal scan printing for the front surface in accordance with the verification result.

In this connection, when registering the above described paper fingerprint, it is favorable to use a stamp function described hereunder. When performing paper fingerprint registration, the user places a paper sheet to undergo registration of paper fingerprint information in the original feeder 201, and enters an instruction to perform paper fingerprint registration using the paper fingerprint information registration tab. The paper fingerprint of the sheet is registered in that same manner as in the first embodiment in response to this user instruction. However, in order to notify the user which side of the white sheet that the registered paper fingerprint information is on, the apparatus has a stamp function at the rear end of the paper conveyance path of the original feeder 201. During conveying of a paper sheet, the aforementioned stamp is stamped on the paper surface for which registration of paper fingerprint information was performed.

When the paper fingerprint information is normally registered in the RAM 302, the CPU 301 displays a guidance message "place the sheet in a paper cassette with the stamped side facing upward" in the region 901 shown in FIG. 9. The user places the sheet in any of the paper cassettes 203 to 205 in accordance with this guidance message. Information of the tray in which the sheet is placed is stored in a storage unit (RAM 302) inside the apparatus. The tray in which the sheet was placed is automatically selected when printing the next print job, and the sheet is conveyed from that tray to obtain a duplicated document or a printed document in accordance with PDL data that is sent from the PC 101. The obtained duplicated document or printed document is used in the above described paper fingerprint verification.

Third Embodiment

The third embodiment of the present invention will now be described in detail referring to the drawings. According to the third embodiment, the propriety or impropriety of making a copy of an original is indicated based on a paper fingerprint information verification result. That is, processing is performed in which, if a verification result is valid, the gain adjustment value is lowered and an image that is read with a second reading operation is printed.

Figure 13:
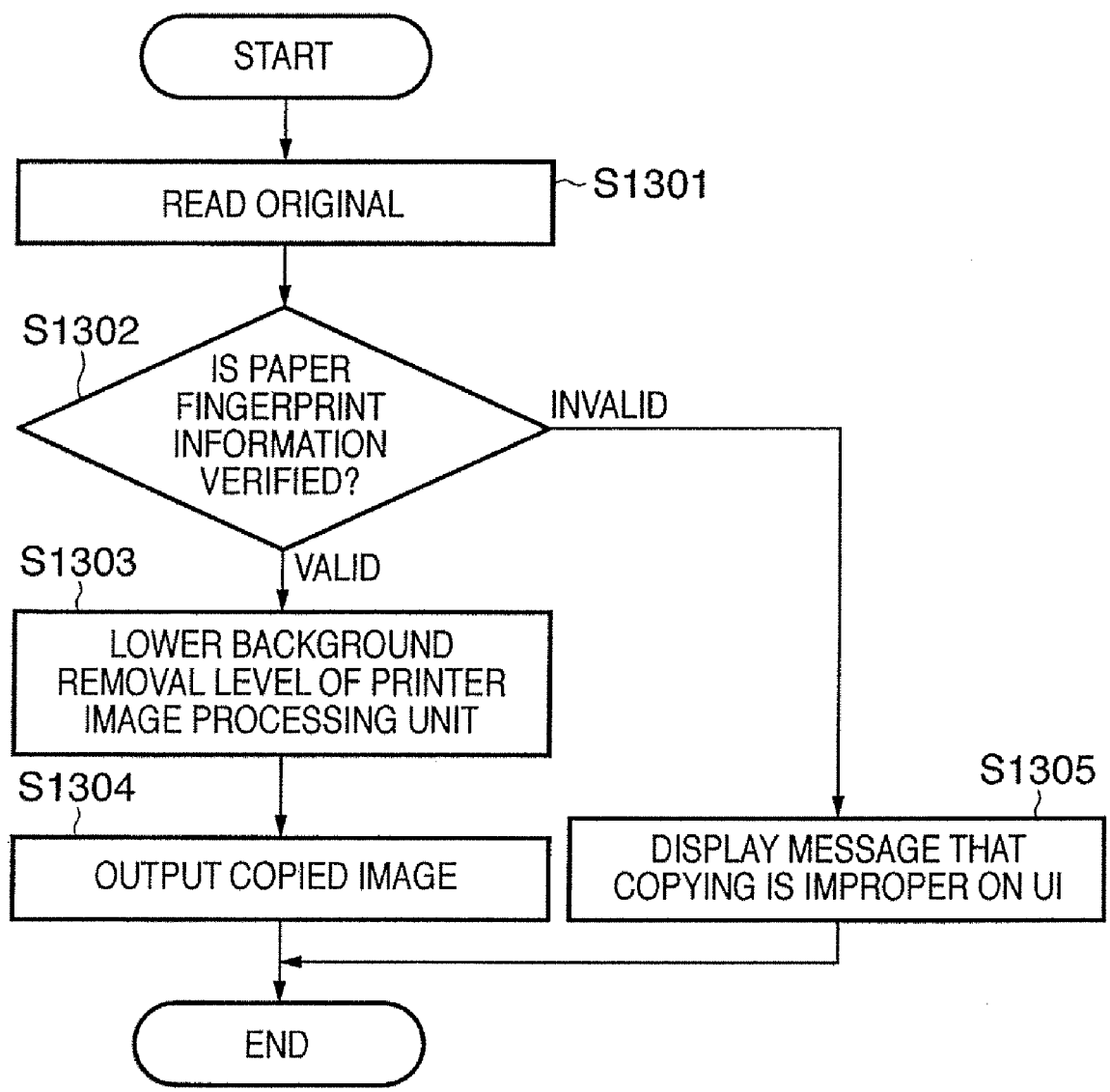
FIG. 13 is a flowchart that illustrates processing that lowers a gain adjustment value and prints a read image in a case where a result obtained after verifying paper fingerprint information is valid.

FIG. 13 is a flowchart that illustrates the procedure of processing that lowers a gain adjustment value and prints a read image in a case where a paper fingerprint information verification result is valid. First, in step S1301 an original is read. Next, in step S1302, verification is performed for the paper fingerprint information of the original. In this case, if the paper fingerprint information verification result is valid, the processing advances to step S1303 to perform printer image processing. In this processing, it is possible that, for the amount by which the gain adjustment value is lowered at reading, a background portion of the original that should originally be white will be output as gray.

Therefore, the CPU 301 instructs the background removal processing unit 701 of the printer image processing unit 315 to change (lower) the level at which the background is removed to perform background removal processing. By adjusting the level for background removal, even for an original that is read as a darkened image it is possible to determine that a background portion is the background and to output the image clearly when outputting.

In step S1304, the copy image is printed.

In contrast, if the paper fingerprint information verification result at step S1302 is invalid, the processing advances to step S1305 to display a message to the effect that copying is not possible on the user interface.

According to the third embodiment, even with a scanner that does not support simultaneous two-sided reading, it is possible to perform processing for both verification of paper fingerprint information and scan printing with one scan operation.

Fourth Embodiment

According to the fourth embodiment, a case is described in which, with respect to the paper fingerprint information verification result of the third embodiment, reading of an original for paper fingerprint information verification and a second reading of the original after changing an amount of light to perform copying and printing are performed when performing copying and printing of an original.

A flowchart that illustrates the processing procedure according to the fourth embodiment is shown in FIG. 18. The processing shown in FIG. 18 is performed under the control of the CPU 301. First, in step S1801, the user selects the paper fingerprint information verification tab 909 shown in FIG. 9. The scanner unit 113 lowers the amount of light of a lamp inside the scanner unit 113 and scans the original. An image signal obtained by this scanning is subjected to shading correction with the normal gain at the shading correcting unit 500 to acquire paper fingerprint information at the paper fingerprint information acquiring unit 507.

In step S1802, the acquired paper fingerprint information is verified against paper fingerprint information that is previously registered. An original which is determined to be "valid" according to the paper fingerprint information verification result at step S1802 is read with an amount of lamp light that is used when performing a normal copy and printing operation at step S1803.

At step S1804, scanner image processing is performed for the image data that is obtained at step S1803. Thereafter, printer image processing is performed, and a copy image is subsequently output at step S1805.

In contrast, if the result at step S1802 is "invalid", copying is determined to be improper at step S1806, and a message to the effect that copying of the original is not possible is displayed on the user interface at step S1807.

In this connection, with respect to the advance paper fingerprint registration processing, paper fingerprint information on a sheet can be obtained by reducing the amount of light of the scanner unit 113 (gain is the normal gain) and performing processing to acquire the paper fingerprint information in response to the paper fingerprint information registration shown in FIG. 9 being designated by the user.

According to the fourth embodiment, it is possible to implement paper fingerprint verification by separately performing reading of an original for paper fingerprint information verification and reading of the original for copying and printing.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of the above described embodiment, and hence the storage medium in which the program code is stored constitutes the present invention.

Examples of the storage medium for supplying the program code include a flexible disk, a hard disk, an optical disk, a magnetic-optical disk, a CD-ROM, a CD-R, a magnetic tape, a non-volatile memory card, and a ROM.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Although the present invention is described above by way of preferred embodiments thereof, the present invention is not limited to the above described embodiments, and various modifications may be made without departing from the spirit or scope of the general inventive concept as defined by the appended claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-328848 filed on Dec. 5, 2006, which is hereby incorporated by reference herein in its entirety.

What is claimed is:

1. An image reading apparatus, comprising:
   a reading unit adapted to read images from both sides of an original;

an adjusting unit adapted to adjust image data of a front surface and image data of a rear surface of the original;

a determination unit adapted to determine processing for paper fingerprint information of the rear surface of the original using image data obtained after adjustment of the image data of the rear surface that is adjusted by said adjusting unit; and a printing unit adapted to print the image data of the front surface, wherein said adjusting unit performs a different adjustment for the image data of the front surface and the image data of the rear surface of the original.

2. The apparatus according to claim 1, wherein the paper fingerprint information is information that represents bumps and entanglements of random fibers on a surface of a paper sheet.

3. The apparatus according to claim 1, wherein said reading unit is also used when registering information that is used in the determination from a paper sheet.

4. The apparatus according to claim 3, wherein said printing unit prints a predetermined mark on the registered paper sheet.

5. The apparatus according to claim 4, further comprising:

a placing unit adapted to place the paper sheet on which the predetermined mark is printed; and a guide unit adapted to guide a placement direction of the paper sheet that is placed in said placing unit.

6. The apparatus according to claim 5, further comprising:

a forming unit adapted to unit adapted to form an image on the paper sheet that is placed in said placing unit.

7. The apparatus according to claim 1, wherein said adjusting unit makes a gain adjustment with respect to the image data of the rear surface smaller than a gain adjustment with respect to the image data of the front surface.

8. An image reading method, comprising:

reading images from both sides of an original;

adjusting image data of a front surface and image data of a rear surface of the original;

determining processing for paper fingerprint information of the rear surface of the original using image data obtained after adjustment of the image data of the rear surface that is adjusted in the adjusting step; and printing the image data of the front surface, wherein the adjusting step performs a different adjustment for the image data of the front surface and the image data of the rear surface of the original.

9. A storage medium, which has stored a program for causing a computer to execute an image reading method set forth in claim 8.

* * * * *